(12) United States Patent
No et al.

(10) Patent No.: US 12,297,117 B2
(45) Date of Patent: May 13, 2025

(54) ALUMINOSILICATE STRUCTURE BODY HAVING NOVEL STRUCTURE AND SKEIN-SHAPED MORPHOLOGY, METHOD FOR PREPARING SAME, AND HPLC COLUMN FILLED WITH SAME AS STATIC BED

(71) Applicant: Kyoung Tai No, Seoul (KR)

(72) Inventors: Kyoung Tai No, Seoul (KR); Saet Byoul Kim, Seoul (KR); Ha Young Son, Yongin-si (KR); Chan Hun Park, Seoul (KR); Suk Kyu Chang, Gwacheon-si (KR); Myung Gil Choi, Seoul (KR); Jin Hwan No, Seoul (KR); Woo Sun Kim, Daejeon (KR)

(73) Assignee: BENTHIC BIO INC. (KR)

( * ) Notice: Subject to any disclaimer, the term of this patent is extended or adjusted under 35 U.S.C. 154(b) by 636 days.

(21) Appl. No.: 17/629,381

(22) PCT Filed: Jul. 24, 2019

(86) PCT No.: PCT/KR2019/009132
§ 371 (c)(1),
(2) Date: Jan. 22, 2022

(87) PCT Pub. No.: WO2021/015335
PCT Pub. Date: Jan. 28, 2021

(65) Prior Publication Data
US 2022/0315433 A1    Oct. 6, 2022

(30) Foreign Application Priority Data
Jul. 23, 2019   (KR) .................. 10-2019-0089030

(51) Int. Cl.
C01B 39/46    (2006.01)
B01J 20/18    (2006.01)
(Continued)

(52) U.S. Cl.
CPC .............. *C01B 39/46* (2013.01); *B01J 20/18* (2013.01); *B01J 20/28004* (2013.01);
(Continued)

(58) Field of Classification Search
CPC ..... B01D 15/10; B01J 20/18; B01J 20/28004; B01J 20/281; B01J 20/282; B01J 2220/86;
(Continued)

(56) References Cited

FOREIGN PATENT DOCUMENTS

KR       100391869 B1    9/2003
KR       20140108665 A   9/2014
(Continued)

OTHER PUBLICATIONS

Huo, Zhiping et al., "Synthesis of zeolite NaP with controllable morphologies", Microporous and Mesoporous Materials 158 (2012) 137-140, Jan. 28, 2012.
(Continued)

*Primary Examiner* — Brian A McCaig
(74) *Attorney, Agent, or Firm* — Renaissance IP Law Group LLP

(57) ABSTRACT

The present inventive concept relates to an aluminosilicate structure body with a novel crystal structure and, more specifically, to an aluminosilicate structure body having a novel crystal structure and a skein-shaped morphology, a method for preparing the same, and an HPLC column filled with the same as a stationary phase. The aluminosilicate structure body according to the present inventive concept has a novel crystal structure and a skein-shaped morphology, and thus has a specific surface area increased to up to 300 $m^2/g$ so as to improve separation ability; and does not undergo a structural change with pH changes, and thus can be usefully used in a wider range of pH conditions than
(Continued)

existing silica gel which has been conventionally used as a stationary phase for HPLC columns.

11 Claims, 14 Drawing Sheets

(51) Int. Cl.
*B01J 20/28* (2006.01)
*B01J 20/282* (2006.01)

(52) U.S. Cl.
CPC .......... *B01J 20/282* (2013.01); *B01J 2220/86* (2013.01); *C01P 2002/72* (2013.01); *C01P 2004/90* (2013.01); *C01P 2006/12* (2013.01)

(58) Field of Classification Search
CPC .. C01B 39/46; C01P 2002/72; C01P 2004/90; C01P 2006/12
See application file for complete search history.

(56) References Cited

FOREIGN PATENT DOCUMENTS

| KR | 20150102361 A | 9/2015 |
| KR | 20170036030 A | 3/2017 |

OTHER PUBLICATIONS

International Search Report for PCT/KR2019/009132 mailed Apr. 22, 2020.

(a)

(b)

ALUMINOSILICATE STRUCTURE BODY HAVING NOVEL STRUCTURE AND SKEIN-SHAPED MORPHOLOGY, METHOD FOR PREPARING SAME, AND HPLC COLUMN FILLED WITH SAME AS STATIC BED

TECHNICAL FIELD

The present disclosure relates to an aluminosilicate structure body with a novel crystal structure, and, more specifically, to an aluminosilicate structure body having a novel crystal structure and a skein-shaped morphology, which can be used as a stationary phase for HPLC columns, a method for preparing the same, and an HPLC column filled with the same as a stationary phase.

BACKGROUND ART

Zeolites are a representative nanoporous aluminosilicate structure body that includes pores having different unique sizes and shapes depending on the internal framework structure, and thus exhibits unique selectivity not observed in amorphous oxides. For this reason, zeolites have been used in a variety of applications as adsorbents, ion exchangers, catalysts or catalyst supports in various chemical fields such as fine chemicals and petrochemicals. In particular, the synthesis of novel nanostructured materials with controlled porosity is a new part of research in the field of new materials.

The zeolite synthesis research as described above has been actively conducted for the past several decades since the development of a hydrothermal synthesis method by Barrer and Milton in the late 1940s, and structural investigation research on a new zeolite is still being conducted. Currently, 232 different zeolite structures have been reported as of 2017, and their structures are disclosed in the Atlas of Zeolite Structure Types, Butterworth 2007, http://www.iza-structure.org/.

Korean Patent No. 644501 discloses a method for preparing a hollow porous carbon-aluminosilicate composite structure body, and proposes applications such as catalysts, adsorbents, sensors, electrode materials, separation and purification or hydrogen and drug storage because the resulting hollow porous carbon-aluminosilicate composite structure has a multiple pore structure, a large specific surface area and a large pore volume due to the characteristics of an organic-inorganic composite structure body of carbon and aluminosilicate.

Korean Patent No. 20319 discloses a method for preparing an aluminosilicate spherical carrier which is excellent in mechanical strength or thermal stability by a simple and efficient process using pseudo-boehmite (AlOOH), and Korean Patent No. 524454 discloses a composition having a highly stable porous aluminosilicate.

Further, Korean Patent No. 460447 discloses a method for preparing amorphous aluminosilicate by a process of gelling an aqueous sodium aluminate solution and an aqueous sodium silicate solution so as to be simultaneously mixed using a kneader that is a continuous blender, in which optimal gelation and aging conditions are imparted.

However, currently commercialized zeolites (aluminosilicates) need to satisfy the pore size, structure, acidity, hydrothermal stability, and the like suitable for the application field, and thus are limited to about 18 types such as LTA, FAU, MFI, MOR, BEA, FER, and LTL. Under these circumstances, since zeolites having a new morphology for having a new framework structure and increasing the specific surface area enable not only the breakthrough improvement of the existing chemical process, but also the development of many commercially important processes due to the new pore properties thereof, there is a continuous need for the zeolites.

DISCLOSURE

Technical Problem

A first object of the present inventive concept is to provide an aluminosilicate structure body having a novel crystal structure and a skein-shaped morphology.

A second object of the present inventive concept is to provide a method for preparing the aluminosilicate structure body having a novel crystal structure and a skein-shaped morphology.

A third object of the present inventive concept is to provide an HPLC column filled with the aluminosilicate structure body having a novel crystal structure and a skein-shaped morphology as a stationary phase.

Technical Solution

To achieve the first object, the present inventive concept provides an aluminosilicate structure body having a basic framework structure of the following Chemical Formula 1, an X-ray diffraction pattern including lattice spacings shown in the following Table 1, and a skein-shaped morphology on the surface layer.

$$1.0\ Al_2O_3:10.0\ to\ 60.0\ SiO_2 \quad [\text{Chemical Formula 1}]$$

TABLE 1

| 2θ | d | 100 × I/I$_0$ |
|---|---|---|
| 12.4-12.8 | 6.90-7.15 | S |
| 17.5-17.6 | 5.00-5.10 | S~VS |
| 20.4-21.6 | 4.10-4.34 | M~S |
| 25.7-25.8 | 3.44-3.48 | M~VS |
| 28.0-28.1 | 3.16-3.20 | M~VS |
| 30.4-30.5 | 2.92-2.96 | M~VS |
| 33.3-33.4 | 2.66-2.70 | W~M |

In Table 1, 2θ, d, and I denote the Bragg angle, the lattice spacing, and the intensity of the X-ray diffraction peak, respectively. All powder X-ray diffraction data reported in the present inventive concept including this powder X-ray diffraction pattern was measured using a standard X-ray diffraction method, and copper Kα rays and an X-ray tube operating at 40 kV and 40 mA were used as a radiation source. The powder X-ray diffraction data was measured from a horizontally compressed powder sample at a rate of 2 degrees (2θ) per minute, and d and I were calculated from the 2θ values and peak heights of the observed X-ray diffraction peaks. The resulting values are expressed as W (weak: 0 to 20), M (medium: 20 to 40), S (strong: 40 to 60), and VS (very strong: 60 to 100) depending on the value of relative strength 100×I/I$_0$. In addition, preferably, the aluminosilicate structure body may have an X-ray diffraction pattern including lattice spacings shown in the following Table 2.

TABLE 2

| 2θ | d | 100 × I/I₀ |
|---|---|---|
| 9.3-9.4 | | W~M |
| 12.4-12.8 | 6.90-7.15 | S |
| 17.5-17.6 | 5.00-5.10 | S~VS |
| 20.4-21.6 | 4.10-4.34 | M~S |
| 25.7-25.8 | 3.44-3.48 | M~VS |
| 28.0-28.1 | 3.16-3.20 | M~VS |
| 30.4-30.5 | 2.92-2.96 | M~VS |
| 33.3-33.4 | 2.66-2.70 | W~M |
| 34.3-34.4 | 2.60-2.65 | W~M |

Furthermore, preferably, the aluminosilicate structure body may have an average particle diameter of 5 to 50 μm.

Further, preferably, the aluminosilicate structure body may have a BET surface area of 20 to 300 m²/g.

In addition, to achieve the second object, the present inventive concept provides a method for preparing an aluminosilicate structure body having a novel crystal structure and a skein-shaped morphology, the method including: preparing a reaction mother solution having a viscosity of 3.1 to 7.1 mPas by quickly adding an aqueous sodium silicate solution prepared by reacting an aqueous sodium hydroxide solution and a silica source to an aqueous sodium aluminate solution prepared by reacting an aqueous sodium hydroxide solution and an alumina source, and stirring the resulting mixture (S10); preparing a synthetic mixture by adding a seed to the reaction mother solution and aging the resulting mixture under stirring (S20); and preparing an aluminosilicate structure body having a novel crystal structure and a skein-shaped morphology by hydrothermally treating the synthetic mixture (S30).

Furthermore, preferably, the composition of the reaction mother solution may be 1.0 Al₂O₃:7.0 to 12.0 SiO₂:4.0 to 8.0 Na₂O:500 to 900 H₂O.

Further, preferably, the aqueous sodium silicate solution may be added to the aqueous sodium aluminate solution and mixed within 5 minutes.

In addition, preferably, as the seed, a seed having a skein-shaped morphology may be used.

Furthermore, preferably, a seed addition amount may be 0.001 to 2 wt %.

Further, preferably, after the seed was added, aging may be performed under stirring at 300 to 400 rpm for 20 to 40 minutes.

In addition, preferably, a crystallization reaction of the synthetic mixture may be performed at 120 to 150° C. for 8 to 28 hours.

Furthermore, to achieve the third object, the present inventive concept provides an HPLC column filled with an aluminosilicate structure body having a basic framework structure of the following Chemical Formula 1, an X-ray diffraction pattern including lattice spacings shown in the following Table 1, and a skein-shaped morphology on the surface layer.

Advantageous Effects

The aluminosilicate structure body according to the present inventive concept has a novel framework structure and a skein-shaped morphology, and thus has a specific surface area increased to up to 300 m²/g so as to improve separation ability and enhance pH stability; and does not undergo a structural change with pH changes, and thus can be usefully used in a wider range of pH conditions than existing silica gel which has been conventionally used as a stationary phase for HPLC columns.

Further, during the preparation of the aluminosilicate structure body according to the present inventive concept, the particle size of the aluminosilicate structure body having a skein-shaped morphology can be adjusted by adjusting the amount of skein-shaped seed added and the reaction time.

The technical effects of the present inventive concept are not limited to those mentioned above, and other technical effects, which have not been mentioned, may be clearly understood by those skilled in the art from the following description.

DETAILED DESCRIPTION

Figure 1:
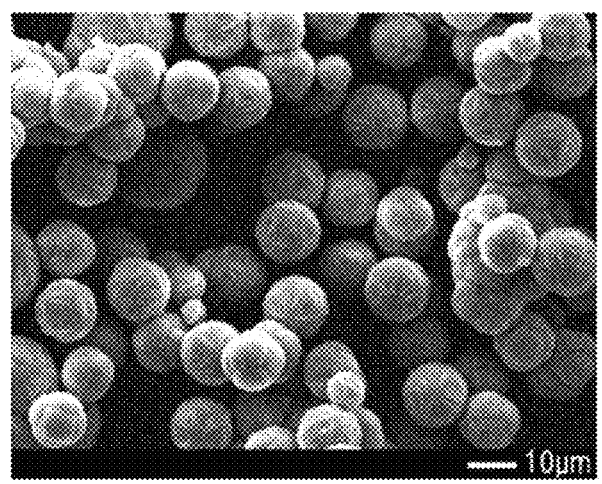
FIG. 1 is a scanning electron microscope (SEM) image of an aluminosilicate structure body having a skein-shaped morphology prepared in Preparation Example 1 of the present inventive concept.

While the present inventive concept allows for various modifications and variations, specific embodiments thereof will be exemplified and illustrated in the drawings and will be detailed below. However, it should be understood that the present inventive concept is not intended to be limited to the particular forms disclosed, and rather, the present inventive concept includes all modifications, equivalents and alternatives falling within the spirit and scope of the present inventive concept as defined by the following appended claims.

When an element such as a layer, region or substrate is mentioned as being present "on" other elements, it may be understood that the element is directly present on the other elements or intermediate elements may also be interposed therebetween.

Although the terms such as a first and a second may be used for describing various elements, components, regions, layers and/or areas, it will be understood that the various elements, components, regions, layers and/or areas are not limited by the terms.

The present inventive concept provides a novel aluminosilicate structure body having a basic framework network of the following Chemical Formula 1, an X-ray diffraction pattern including lattice spacings shown in the following Table 1, and a skein-shaped morphology on the surface layer.

$$1.0\ Al_2O_3 : 10.0\ to\ 60.0\ SiO_2 \quad \text{[Chemical Formula 1]}$$

TABLE 1

| 2θ | d | 100 × I/I$_0$ |
|---|---|---|
| 12.4-12.8 | 6.90-7.15 | S |
| 17.5-17.6 | 5.00-5.10 | S~VS |
| 20.4-21.6 | 4.10-4.34 | M~S |
| 25.7-25.8 | 3.44-3.48 | M~VS |
| 28.0-28.1 | 3.16-3.20 | M~VS |

TABLE 1-continued

| 2θ | d | 100 × I/I$_0$ |
|---|---|---|
| 30.4-30.5 | 2.92-2.96 | M~VS |
| 33.3-33.4 | 2.66-2.70 | W~M |

In Table 1, 2θ, d, and I mean the Bragg angle, the lattice spacing, and the intensity of the X-ray diffraction peak, respectively. All powder X-ray diffraction data reported in the present inventive concept including this powder X-ray diffraction pattern was measured using a standard X-ray diffraction method, and copper Kα rays and an X-ray tube operating at 40 kV and 40 mA were used as a radiation source. The powder X-ray diffraction data was measured from a horizontally compressed powder sample at a rate of 2 degrees (2θ) per minute, and d and I were calculated from the 2θ values and peak heights of the observed X-ray diffraction peaks. The resulting values are expressed as W (weak: 0 to 20), M (medium: 20 to 40), S (strong: 40 to 60), and VS (very strong: 60 to 100) depending on the value of relative strength 100×I/I$_0$.

In addition, preferably, the aluminosilicate structure body may have an X-ray diffraction pattern including lattice spacings shown in the following Table 2.

TABLE 2

| 2θ | d | 100 × I/I$_0$ |
|---|---|---|
| 9.3-9.4 | | W~M |
| 12.4-12.8 | 6.90-7.15 | S |
| 17.5-17.6 | 5.00-5.10 | S~VS |
| 20.4-21.6 | 4.10-4.34 | M~S |
| 25.7-25.8 | 3.44-3.48 | M~VS |
| 28.0-28.1 | 3.16-3.20 | M~VS |
| 30.4-30.5 | 2.92-2.96 | M~VS |
| 33.3-33.4 | 2.66-2.70 | W~M |
| 34.3-34.4 | 2.60-2.65 | W~M |

The aluminosilicate structure body is an aluminosilicate structure body having an unknown structure in the related art, and is characterized in that the surface layer has a yarn skein shaped (skein-shaped) morphology in which yarns are intertwined.

Figure 7:
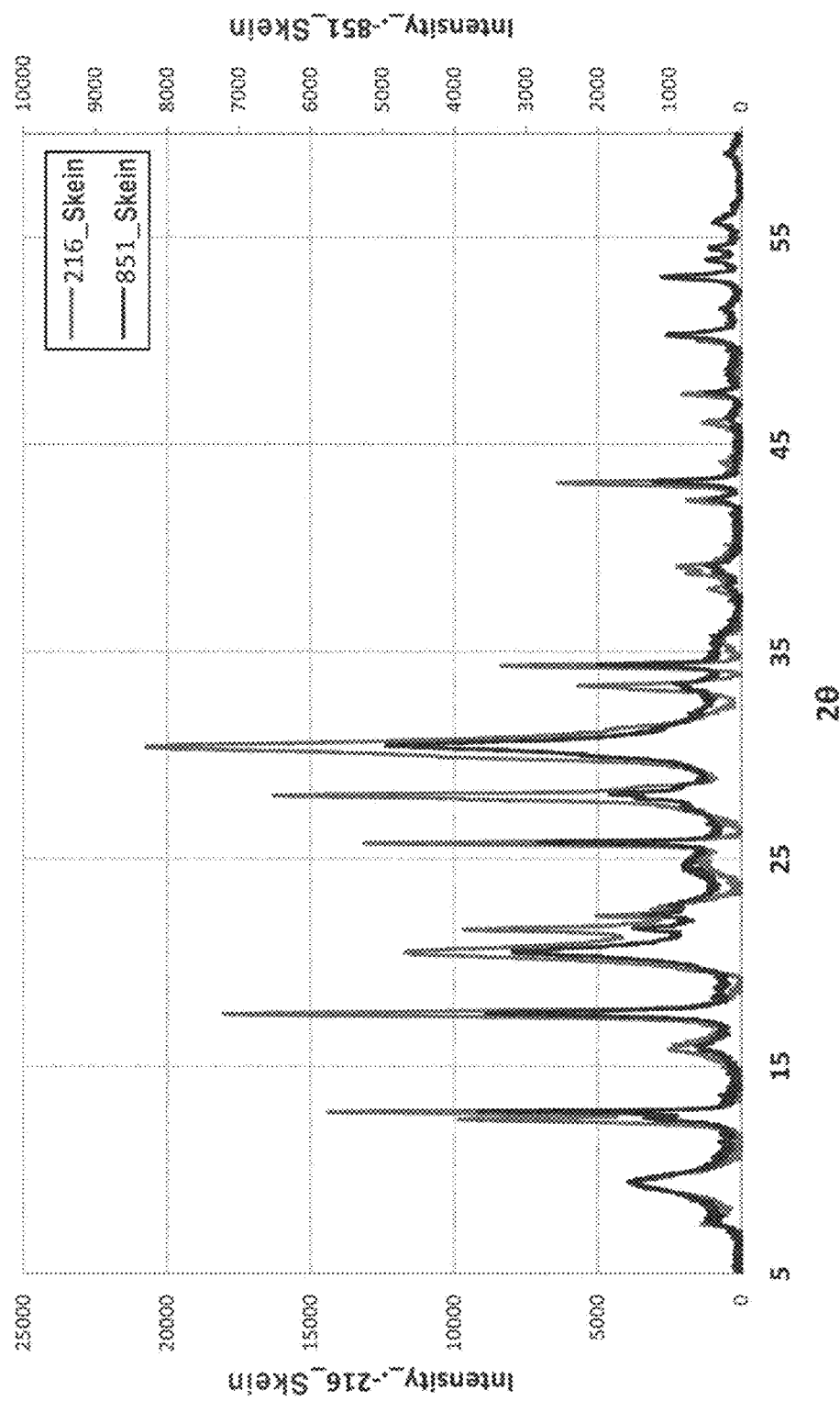
FIG. 7 illustrates X-ray diffraction analysis (XRD) patterns of aluminosilicate structure bodies having a skein-shaped morphology prepared in Preparation Examples 3 and 5 of the present inventive concept.
Figure 8:
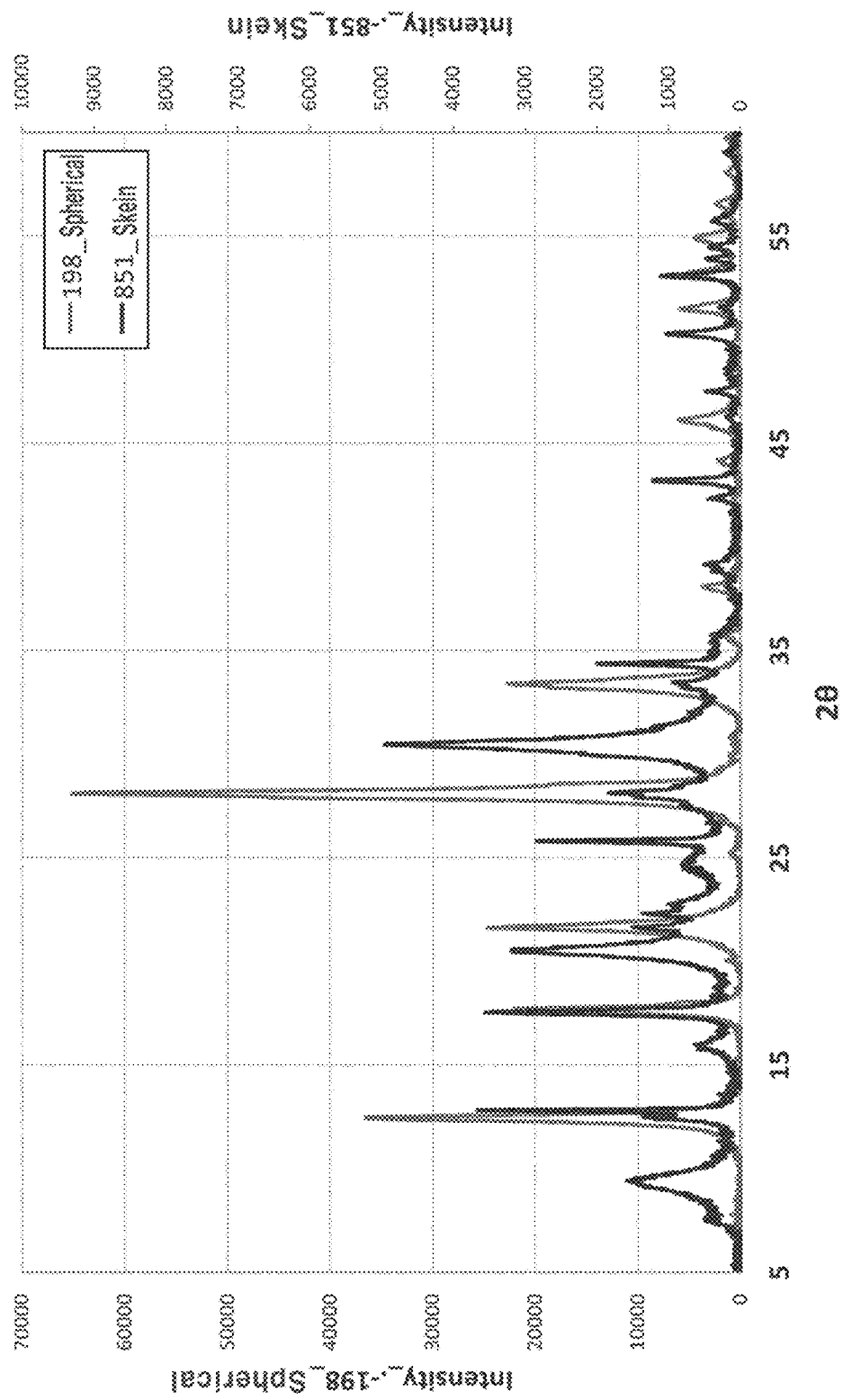
FIG. 8 illustrates X-ray diffraction analysis (XRD) patterns of aluminosilicate structure bodies prepared in Preparation Example 3 and Comparative Example 1 of the present inventive concept.
Figure 9:
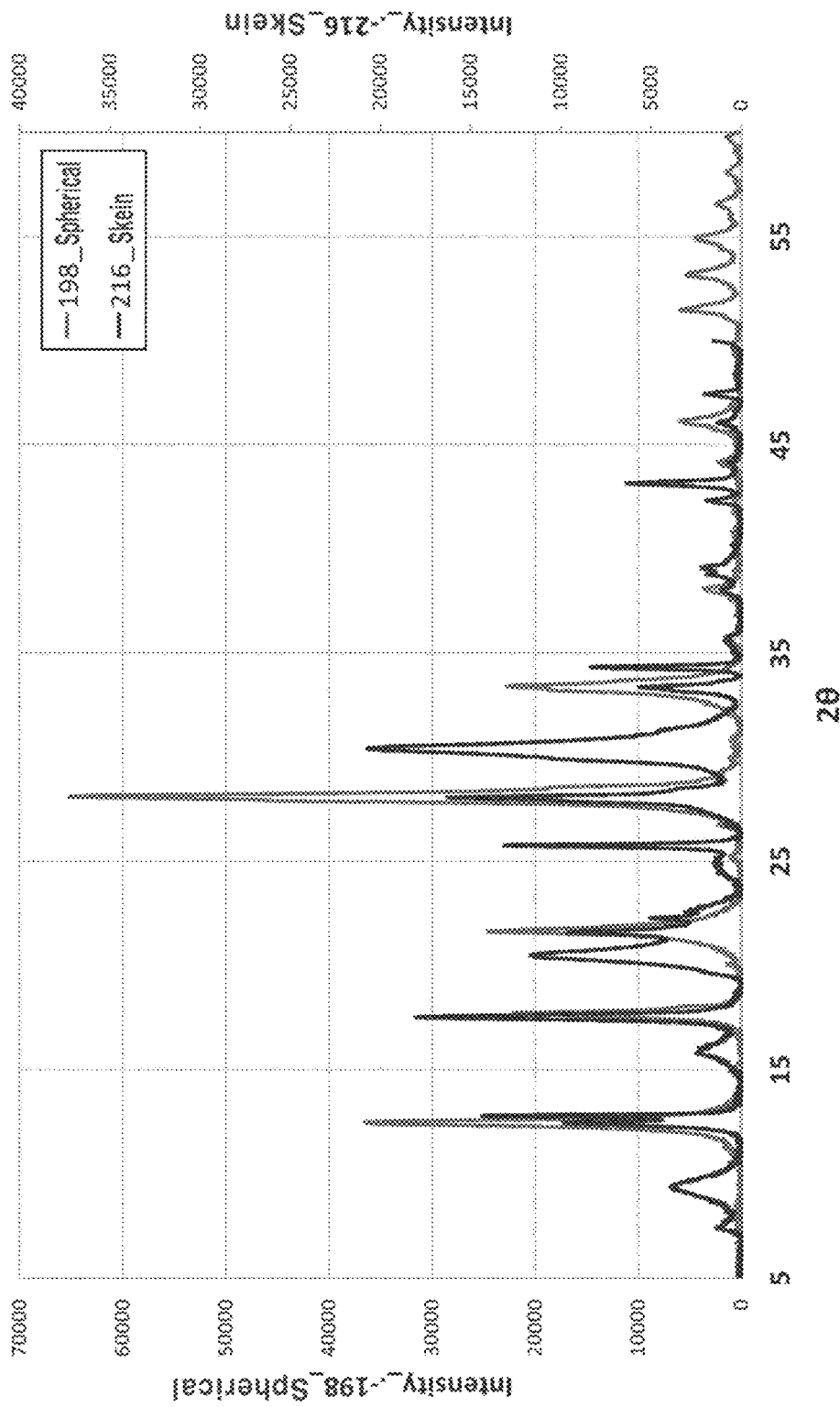
FIG. 9 illustrates X-ray diffraction analysis (XRD) patterns of aluminosilicate structure bodies prepared in Preparation Example 3 and Comparative Example 2 of the present inventive concept.

Specific X-ray diffraction patterns of the aluminosilicate structure body according to an exemplary embodiment of the present inventive concept are illustrated in FIGS. 7 to 9, and have X-ray diffraction patterns different from GIS (see FIG. 8, a spherical morphology) or ANA (see FIG. 9, a polygonal morphology) known in the related art.

The aluminosilicate structure body having a novel crystal structure according to the present inventive concept may have a pore size of 2.0 nm to 10.0 nm, and a specific surface area (BET) may be 20 to 300 m$^2$/g due to the unevenness effect of the skein-shaped surface layer.

In general, it is difficult to prepare an aluminosilicate structure body having a diameter size of 1 μm or more through synthesis by a typical hydrothermal reaction. However, for the aluminosilicate structure body having a novel structure according to the present inventive concept, by adjusting the seed addition amount and the reaction time by a preparation method to be described below, the average diameter of particles may be adjusted, and preferably, the average particle diameter may be adjusted to 5 to 50 μm.

Due to such particle size and skein-shaped morphology, the aluminosilicate structure body having a novel structure according to the present inventive concept has an improved specific surface area of up to 300 m$^2$/g, so that the separation ability is improved when the aluminosilicate structure body is used as a stationary phase for HPLC columns.

Further, the present inventive concept provides a method for preparing a novel aluminosilicate structure body having the basic framework structure of Chemical Formula 1, the X-ray diffraction pattern including the lattice spacings shown in Table 1, and the skein-shaped morphology on the surface layer.

The method for preparing a novel aluminosilicate structure body includes: preparing a reaction mother solution (S10); preparing a synthetic mixture by adding a seed to the reaction mother solution and aging the resulting mixture under stirring (S20); and preparing an aluminosilicate structure body having a novel crystal structure and a skein-shaped morphology by hydrothermally treating the synthetic mixture (S30).

Hereinafter, the method for preparing a novel aluminosilicate structure body according to the present inventive concept will be described in detail step by step.

First, step S10 is preparing a reaction mother solution.

The composition of the reaction mother solution is 1.0 $Al_2O_3$:7.0 to 12.0 $SiO_2$:4.0 to 8.0 $Na_2O$:500 to 900 $H_2O$, but is not limited thereto.

The reaction mother solution may be prepared by quickly adding an aqueous sodium silicate solution prepared by mixing an aqueous sodium hydroxide solution and a silica source to an aqueous sodium aluminate solution prepared by mixing an aqueous sodium hydroxide solution and an alumina source, and stirring the resulting mixture.

As the alumina source, an alumina source typically used in the art may be used, and may be selected from, for example, sodium aluminate ($NaAlO_2$), aluminum nitrate ($Al(NO_3)_3 \cdot 9H_2O$), aluminum sulfate ($Al_2(SO_4)_3 \cdot 18H_2O$), aluminum chloride ($AlCl_3 \cdot 6H_2O$), aluminum hydroxide ($Al(OH)_3$), aluminum alkoxide and alumina gel.

The silica source, a silica source typically used in the art may be used, and may be selected from, for example, colloidal silica, fumed silica, water glass (aqueous sodium silicate solution) and silica gel, but is not limited thereto.

In this case, the viscosity of the reaction mother solution varies depending on the rate at which the aqueous sodium silicate solution is added to the aqueous sodium aluminate solution, and for example, when the aqueous sodium silicate is quickly added to the aqueous sodium aluminate solution within 5 minutes, the viscosity of the reaction mother solution is decreased to 4.0 mPa or less, whereas when the aqueous sodium silicate solution is slowly added, the viscosity of the reaction mother solution is increased to 7.7 mPas or more. This allows the aqueous sodium aluminate solution and the aqueous sodium silicate solution to combine with each other and form a gel while reacting with each other, and when the solution is quickly added and then stirred, the rotational force due to stirring during the gel formation suppresses the aggregation of the gel, so that a relatively low viscosity may be maintained because the free mobility of gel particles is relatively large, but when the solution is slowly mixed, the gel formation is already completed, and thus, the rotational force due to stirring fails to completely break the bond of the gel, and therefore, a relatively high viscosity is maintained because the free mobility of gel particles is reduced. The viscosity of such a reaction mother solution affects the formation of a morphology on the surface layer of the particles when the particles grow by reacting with seeds thereafter.

In this case, it is preferred that the viscosity of the reaction mother solution is 3.1 to 7.7 mPas, but when the viscosity of the reaction mother solution exceeds 7.7 mPas, the free mobility of the material is reduced during a subsequent crystallization reaction, the material is solidified before a morphology in a desired form is formed, and thus the aluminosilicate structure body having a skein-shaped morphology is formed in a non-uniform distribution, and therefore, there is a problem in that a part of the aluminosilicate structure body does not have the skein-shaped morphology, and there is a problem in that it is difficult to implement a decrease in viscosity of the reaction mother solution to less than 3.1 mPas using the current technology.

Next, step S20 is preparing a synthetic mixture.

Specifically, the synthetic mixture may be prepared by putting a seed into a reaction mother solution whose viscosity is maintained at 3.1 to 7.7 mPas and aging the resulting mixture under stirring.

The seed is added to the reaction mother solution to serve as a nucleus. Therefore, when a synthetic mixture is prepared by introducing a seed, the seed reacts with a growth source (Al, Si) during a subsequent hydrothermal treatment, and thus grows into particles having a size of several to several tens of micrometers.

In this case, it is preferred to use a seed having a skein-shaped morphology as the seed. In the seed, the present inventor observed the morphology of an aluminosilicate structure body produced according to the morphology of the seed using a seed having various morphologies such as skein-shaped, spherical or polygonal, and as a result, when the morphology of the seed is a skein-shape, an aluminosilicate structure body having a skein-shaped morphology was formed regardless of the size of the seed, but when the seed has a spherical or polygonal morphology, the aluminosilicate structure body having a skein-shaped morphology was only partially formed, thereby showing the formation of the aluminosilicate structure body in a non-uniform distribution (see FIGS. 10 to 12). Therefore, it is essential that the seed has a skein-shaped morphology. A seed having such a skein-shaped morphology may be prepared by a known document in the related art, a method that does not use a seed among the methods according to the present inventive concept, or the like.

The seed addition amount may be 0.001 to 2 wt % of the reaction mother solution, but is not limited thereto.

Figure 15:
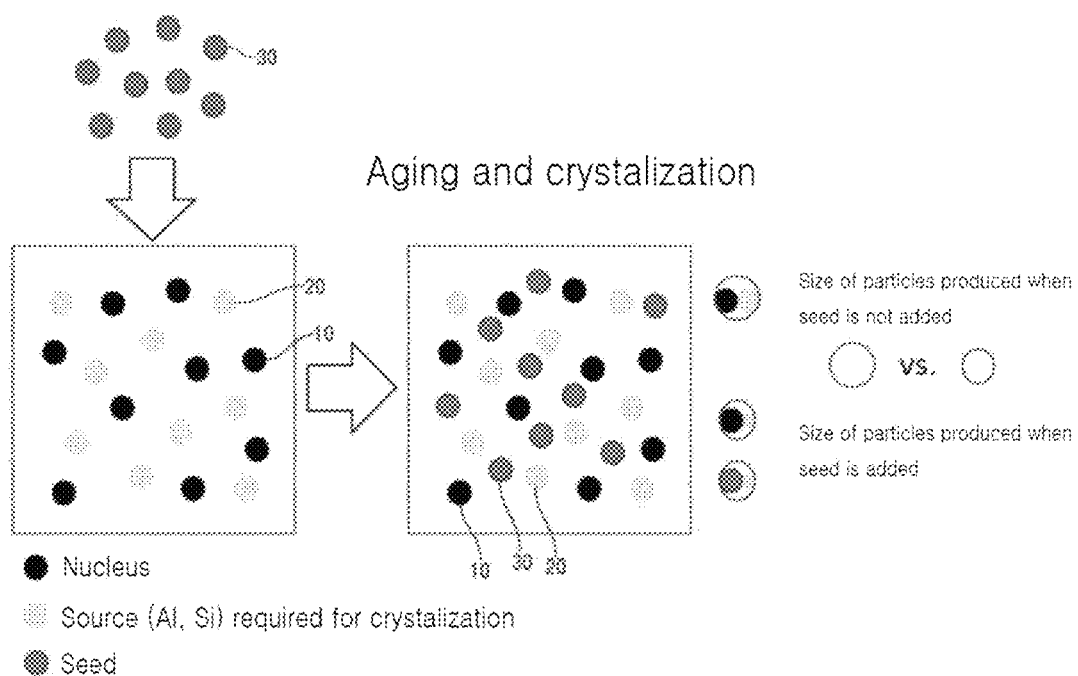
FIG. 15 is a schematic view describing the effect of the addition of the seed on the size of the product in the method for preparing aluminosilicate according to the present inventive concept.

As the seed addition amount increases, the size of a produced aluminosilicate structure body decreases, and this is because, as illustrated in FIG. 15, the amount of growth source 20 used for the growth of particles is constant, but when the amount of seed 30 to be added increases, the seed 30 dividedly has a growth source 20 for the growth of particles while serving as a nucleus 10 in the reaction mother solution, and thus the growth source 20 that an individual seed or nucleus has is reduced.

Therefore, the size of produced particles may be adjusted by adjusting the addition amount of the seed 30.

After the seed is added, aging may be performed under stirring at 300 to 400 rpm for 20 to 40 minutes.

Next, step S30 is hydrothermally treating the synthetic mixture.

The hydrothermally treating of the synthetic mixture may be performed by hydrothermally treating the synthetic mixture at 120 to 150° C. for 8 to 28 hours.

In this case, the reaction time of a hydrothermal treatment affects the size of a product (see Experimental Example 5), and therefore, the size of produced particles may be adjusted by adjusting the reaction time of the hydrothermal treatment.

After step S30, filtering, cleaning and drying steps may be further performed.

The aluminosilicate structure body prepared by the preparation method has a novel framework structure and a skein-shaped morphology, and thus has a specific surface area increased to up to 300 m²/g so as to improve separation ability and enhance pH stability; and does not undergo a structural change with pH changes and is also excellent in separation ability effect of a mixed solution of two solvents having similar polarities, and thus may be usefully used as a stationary phase for HPLC columns.

Thus, the present inventive concept provides an HPLC column filled with an aluminosilicate structure body having an X-ray diffraction pattern of the novel crystal structure and a skein-shaped morphology on the surface layer as a stationary phase.

As a method for filling the HPLC column, a method typically performed in the art may be used, and for example, the aluminosilicate structure body may be prepared by washing the inside of the HPLC column with hydrochloric acid, nitrogen, water, methanol, and the like, mixing the aluminosilicate structure body having a novel crystal structure and an X-ray diffraction pattern according to the present inventive concept with a solvent to form a slurry, and then filling an empty column for HPLC with the slurry using a packer.

Hereinafter, preferred experimental examples for facilitating the understanding of the present inventive concept will be suggested. However, the following experimental examples are provided only to facilitate the understanding of the present inventive concept, and the present inventive concept is not limited by the following experimental examples.

Preparation Example 1: Preparation of Skein-Shaped Aluminosilicate Structure Body (1) Preparation of Skein-Shaped Aluminosilicate Structure Body Seed 837.8 g of $H_2O$ was weighed in a Teflon beaker, and an aqueous NaOH solution dissolved by adding 13.0 g of NaOH thereto and stirring the resulting mixture for 30 minutes was divided into halves and prepared in each Teflon beaker. In the first beaker, an aqueous sodium aluminate solution was prepared by adding 17.1 g of $NaAlO_2$ to the aqueous NaOH solution and completely dissolving the resulting mixture under stirring at 300 rpm for 30 minutes, and in the second beaker, an aqueous sodium silicate solution was prepared by adding 132.1 g of $Na_2SiO_3$ to the aqueous NaOH solution and completely dissolving the resulting mixture under stirring at 300 rpm for 30 minutes. Then, a reaction mother solution having a composition of the following molar ratio in the form of a gel was prepared by quickly adding the aqueous sodium aluminate solution to the aqueous sodium silicate solution within 5 minutes and stirring the resulting mixture.

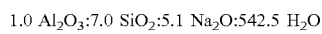

1.0 $Al_2O_3$:7.0 $SiO_2$:5.1 $Na_2O$:542.5 $H_2O$

An aging process was performed by stirring the solution in the form of a gel at 300 rpm for 30 minutes. When the aging was finished, a skein-shaped aluminosilicate structure body seed having an average particle diameter of 5 μm or less was prepared by transferring the reactant to a reactor, fastening the reactor, placing the reactor in an autoclave, and performing a crystallization reaction at 130° C. for 16 hours.
(2) Preparation of Skein-Shaped Aluminosilicate Structure Body A reaction mother solution having a composition with a molar ratio of 1.0 $Al_2O_3$:7.0 $SiO_2$:5.1 $Na_2O$:542.5 $H_2O$ in the form of a gel was prepared in the same manner as in (1).

When the viscosity of the solution in the form of a gel became 3.9 mPa s, an aging process was performed by adding 1 g of the skein-shaped aluminosilicate structure body seed prepared in (1) thereto and stirring the resulting mixture at 300 rpm for 30 minutes. When the aging was finished, skein-shaped aluminosilicate structure body particles having a size of 12 μm were prepared by transferring the reactant to a reactor, fastening the reactor, placing the reactor in an autoclave, and performing a crystallization reaction at 130° C. for 16 hours.

The prepared aluminosilicate structure particles were observed under a scanning electron microscope (SEM), and are illustrated in FIG. 1.

As illustrated in FIG. 1, it was confirmed that the surface of particles exhibited a morphology such as a yarn skein.

The size of the particles was 12 μm (average particle diameter), and the specific surface area (BET) was 164.196 m²/g.

Preparation Example 2: Preparation of Skein-Shaped Aluminosilicate Structure Body Skein-shaped aluminosilicate structure body particles were prepared in the same manner as in Preparation Example 1, except that 2 g of the skein-shaped aluminosilicate structure body seed was added.

Figure 2:
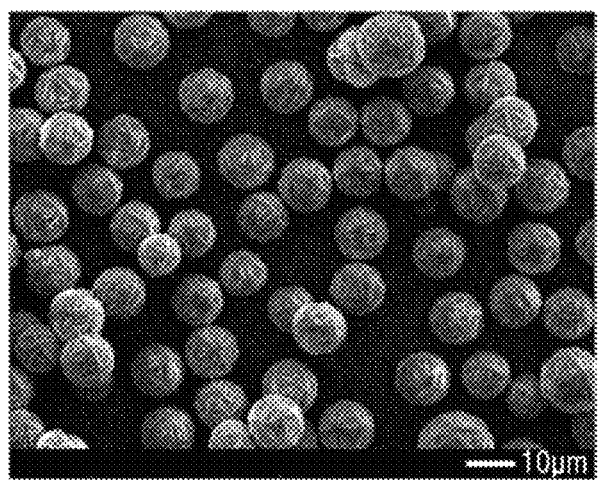
FIG. 2 is a scanning electron microscope (SEM) image of an aluminosilicate structure body having a skein-shaped morphology prepared in Preparation Example 2 of the present inventive concept.

The prepared aluminosilicate structure particles were observed under a scanning electron microscope (SEM), and are illustrated in FIG. 2.

As illustrated in FIG. 2, it was confirmed that the surface of particles exhibited a morphology such as a thread skein.

The size of the particles was 10 μm (average particle diameter), and the specific surface area (BET) was 30.47 m²/g.

Preparation Example 3: Preparation of Skein-Shaped Aluminosilicate Structure Body (#851)

33.5 kg of $H_2O$ was weighed in a Teflon container, 520.2 g of NaOH was added thereto, and the resulting mixture was dissolved under stirring for 30 minutes. The dissolved aqueous NaOH solution was divided into halves and prepared in each Teflon container. 685.9 g of $NaAlO_2$ was added to the aqueous NaOH solution in the first container, 5.3 kg of $Na_2SiO_3$ was added to the second container, and skein-shaped aluminosilicate structure body particles having an average particle diameter of 8 μm and a specific surface area (BET) of 22.11 m²/g were obtained in the same manner as in Preparation Example 1, except that 40 g of the skein-shaped aluminosilicate structure body seed was added to each container and the resulting mixture was allowed to react at 105° C. under a pressure of 2.5 atm for 29 hours.

Preparation Example 4: Preparation of Skein-Shaped Aluminosilicate Structure Body (#652)

6.7 kg of $H_2O$ was weighed in a Teflon container, 104.1 g of NaOH was added thereto, and the resulting mixture was dissolved under stirring for 30 minutes. The dissolved aqueous NaOH solution was divided into halves and prepared in each Teflon container. 137.2 g of $NaAlO_2$ was added to the aqueous NaOH solution in the first container, 1.1 kg of $Na_2SiO_3$ was added to the second container, and skein-shaped aluminosilicate structure body particles having an average particle diameter of 12 μm and a specific surface area (BET) of 68.98 m²/g were obtained in the same manner as in Preparation Example 1, except that 20 g of the skein-shaped aluminosilicate structure body seed was added to each container and the resulting mixture was allowed to react at 120° C. under a pressure of 2.2 atm for 20 hours.

Preparation Example 5: Preparation of
Skein-Shaped Aluminosilicate Structure Body
(#216)

844.5 g of $H_2O$ was weighed in a Teflon beaker, and an aqueous NaOH solution dissolved by adding 5.4 g of NaOH thereto and stirring the resulting mixture for 30 minutes was divided into halves and prepared in each Teflon beaker. In the first beaker, an aqueous sodium aluminate solution was prepared by adding 17.3 g of $NaAlO_2$ to the aqueous NaOH solution and completely dissolving the resulting mixture under stirring at 300 rpm for 30 minutes, and in the second beaker, an aqueous sodium silicate solution was prepared by adding 132.9 g of $Na_2SiO_3$ to the aqueous NaOH solution and completely dissolving the resulting mixture under stirring at 300 rpm for 30 minutes. Then, a reaction mother solution having a composition of the following molar ratio in the form of a gel was prepared by quickly adding an aqueous sodium aluminate solution to the aqueous sodium silicate solution and stirring the resulting mixture.

1.0 $Al_2O_3$:7.0 $SiO_2$:4.1 $Na_2O$:542.5 $H_2O$

When the viscosity of the solution in the form of a gel became 3.9 mPa s, an aging process was performed by adding 1 g of the skein-shaped aluminosilicate structure body seed thereto and stirring the resulting mixture at 300 rpm for 30 minutes. When the aging was finished, skein-shaped aluminosilicate structure body particles having an average particle diameter of 9 μm and a specific surface area (BET) of 94.53 m²/g were prepared by transferring the reactant to a reactor, fastening the reactor, placing the reactor in an autoclave, and performing a crystallization reaction at 130° C. under a pressure of 2.5 atm for 12 hours.

Preparation Example 6: Preparation of
Skein-Shaped Aluminosilicate Structure Body
(#684)

3351.1 g of $H_2O$ was weighed in a Teflon beaker, 52.2 g of NaOH was added thereto, and the resulting mixture was dissolved under stirring for 30 minutes. The dissolved aqueous NaOH solution was divided into halves and prepared in each Teflon container. 68.6 g of $NaAlO_2$ was added to the aqueous NaOH solution in the first container, 528.2 g of $Na_2SiO_3$ was added to the second container, and skein-shaped aluminosilicate structure body particles having an average particle diameter of 12 μm and a specific surface area (BET) of 220.0 m²/g were obtained in the same manner as in Preparation Example 1, except that 4 g of the skein-shaped aluminosilicate structure body seed was added to each container and the resulting mixture was allowed to react at 120° C. for 20 hours.

Figure 3:
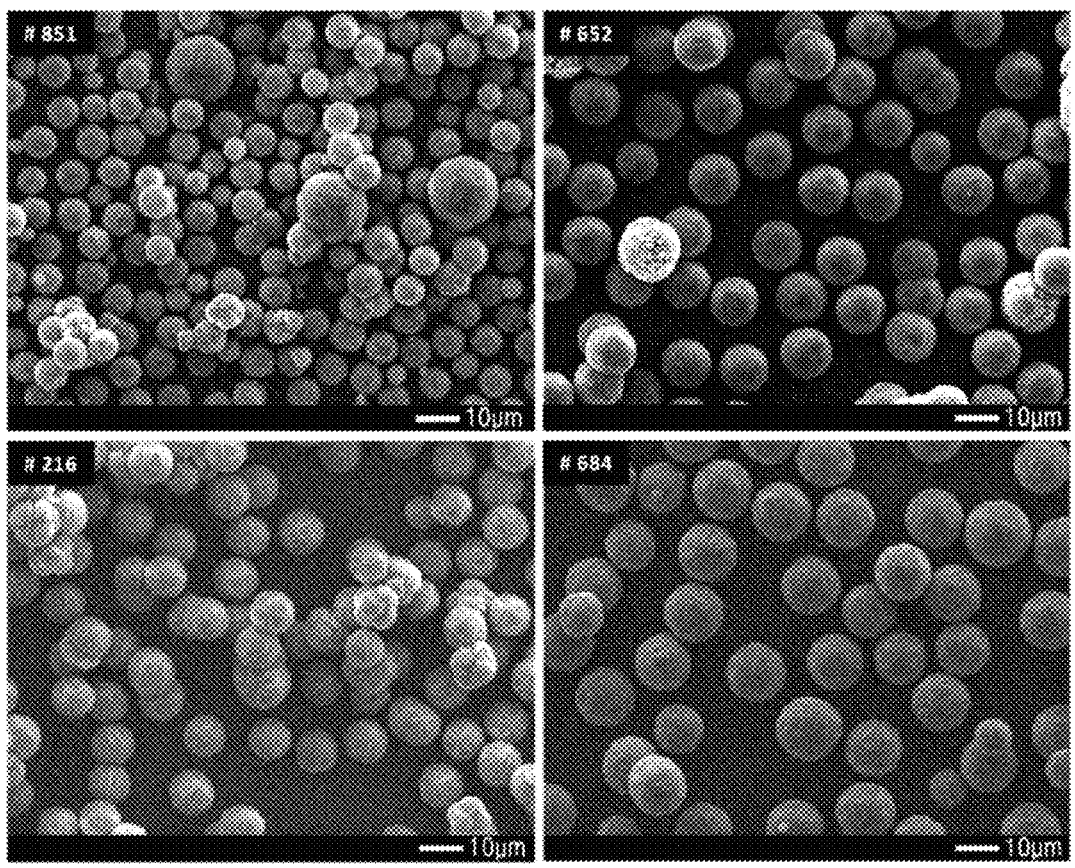
FIG. 3 is a set of scanning electron microscope (SEM) images of aluminosilicate structure bodies having a skein-shaped morphology prepared in Preparation Examples 3 to 6 of the present inventive concept.

The surfaces of the aluminosilicate structure body particles prepared in Preparation Examples 3 to 6 were observed under a scanning electron microscope, and are illustrated in FIG. 3.

As illustrated in FIG. 3, it was confirmed that the particle surfaces of the aluminosilicate structure body particles prepared in Preparation Examples 3 to 6 exhibited a morphology such as a yarn skein.

Preparation Example 7: Preparation of
Skein-Shaped Aluminosilicate Structure Body
(#750)

843.4 g of $H_2O$ was weighed in a Teflon beaker, and an aqueous NaOH solution dissolved by adding 14.6 g of NaOH thereto and stirring the resulting mixture for 30 minutes was divided into halves and prepared in each Teflon beaker. In the first beaker, an aqueous sodium aluminate solution was prepared by adding 10.4 g of $NaAlO_2$ to the aqueous NaOH solution and completely dissolving the resulting mixture under stirring at 300 rpm for 30 minutes, and in the second beaker, an aqueous sodium silicate solution was prepared by adding 131.5 g of $Na_2SiO_3$ to the aqueous NaOH solution and completely dissolving the resulting mixture under stirring at 300 rpm for 30 minutes. Then, a reaction mother solution having a composition of the following molar ratio in the form of a gel was prepared by quickly adding an aqueous sodium aluminate solution to the aqueous sodium silicate solution and stirring the resulting mixture.

1.0 $Al_2O_3$:11.5 $SiO_2$:8.0 $Na_2O$:900 $H_2O$

When the viscosity of the reaction mother solution in the form of a gel became 3.9 mPa s, an aging process was performed by adding 2 g of the skein-shaped aluminosilicate structure body seed thereto and stirring the resulting mixture at 300 rpm for 30 minutes. When the aging was finished, skein-shaped aluminosilicate structure body particles having an average particle diameter of 8 μm and a specific surface area (BET) of 164.196 m²/g were prepared by transferring the reactant to a reactor, fastening the reactor, placing the reactor in an autoclave, and performing a crystallization reaction at 130° C. under a pressure of 2.5 atm for 8 hours.

Figure 4:
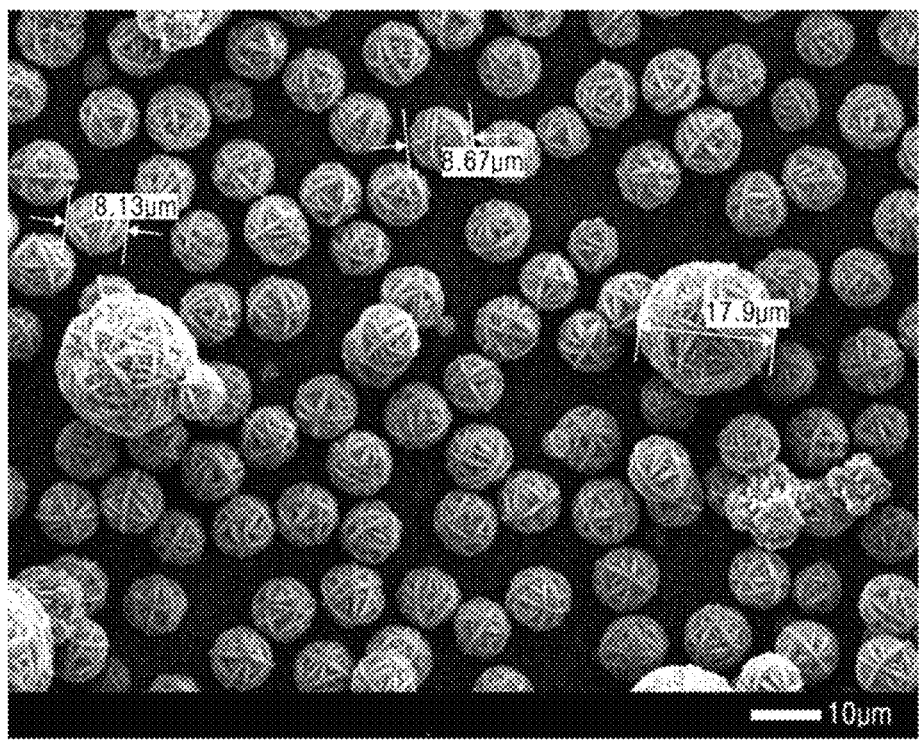
FIG. 4 is a scanning electron microscope (SEM) image of an aluminosilicate structure body having a skein-shaped morphology prepared in Preparation Example 7 of the present inventive concept.

The surfaces of the prepared aluminosilicate structure body particles were observed under a scanning electron microscope, and are illustrated in FIG. 4.

As illustrated in FIG. 4, the particle surfaces of the aluminosilicate structure body particles prepared in Preparation Example 7 exhibited a morphology such as a yarn skein.

Comparative Example 1: Preparation of GIS-Type
Aluminosilicate Structure Body (#198)

837.8 g of $H_2O$ was weighed in a Teflon beaker, and an aqueous NaOH solution dissolved by adding 13.0 g of NaOH thereto and stirring the resulting mixture for 30 minutes was divided into halves and prepared in each Teflon beaker. In the first beaker, an aqueous sodium aluminate solution was prepared by adding 17.1 g of $NaAlO_2$ to the aqueous NaOH solution and completely dissolving the resulting mixture under stirring at 300 rpm for 30 minutes, and in the second beaker, an aqueous sodium silicate solution was prepared by adding 132.1 g of $Na_2SiO_3$ to the aqueous NaOH solution and completely dissolving the resulting mixture under stirring at 300 rpm for 30 minutes. Then, a reaction mother solution having a composition of the following molar ratio in the form of a gel was prepared by quickly adding an aqueous sodium aluminate solution to the aqueous sodium silicate solution and stirring the resulting mixture.

1.0 Al$_2$O$_3$:7.0 SiO$_2$:5.1 Na$_2$O:542.5 H$_2$O

An aging process was performed by stirring the solution in the form of a gel at room temperature at 300 rpm for 30 minutes. When the aging was finished, GIS-type aluminosilicate structure body particles having an average particle diameter of about 20 μm and a specific surface area (BET) of 12.24 m$^2$/g were prepared by transferring the reactant to a reactor, fastening the reactor, placing the reactor in an autoclave, and performing a crystallization reaction at 130° C. for 14 hours.

Figure 5:
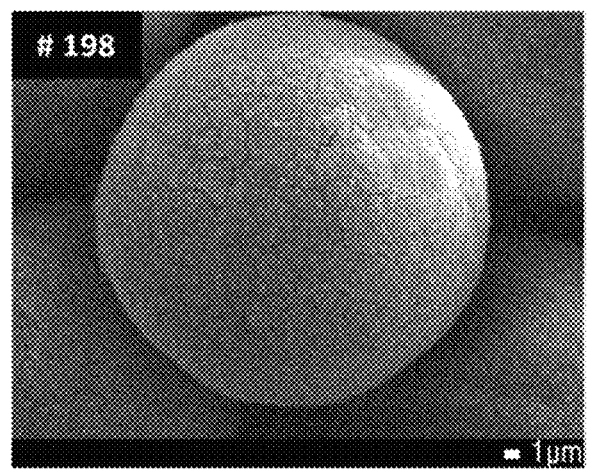
FIG. 5 is a scanning electron microscope (SEM) image of an aluminosilicate structure body having a spherical morphology prepared in Comparative Example 1 of the present inventive concept.

The surfaces of the prepared aluminosilicate structure body particles were observed under a scanning electron microscope, and are illustrated in FIG. 5.

As illustrated in FIG. 5, it was confirmed that the surface of the prepared particles exhibited a smooth spherical shape.

Comparative Example 2: Preparation of ANA-Type Aluminosilicate Structure (#107)

16.8 g of H$_2$O was weighed in a Teflon container, 260.1 g of NaOH was added thereto, and the resulting mixture was dissolved under stirring for 30 minutes. The dissolved aqueous NaOH solution was divided into halves and prepared in each Teflon container. 343.0 g of NaAlO$_2$ was added to the aqueous NaOH solution in the first container, 2.6 kg of Na$_2$SiO$_3$ was added to the second container, and ANA-type aluminosilicate structure body particles having an average particle diameter of about 20 μm and a specific surface area (BET) of 10.40 m$^2$/g were obtained in the same manner as in Comparative Example 1, except that stirring was performed at 400 rpm and the crystallization reaction was performed at 165° C. under a pressure of 5 atm for 22 hours under stirring at 80 rpm.

Figure 6:
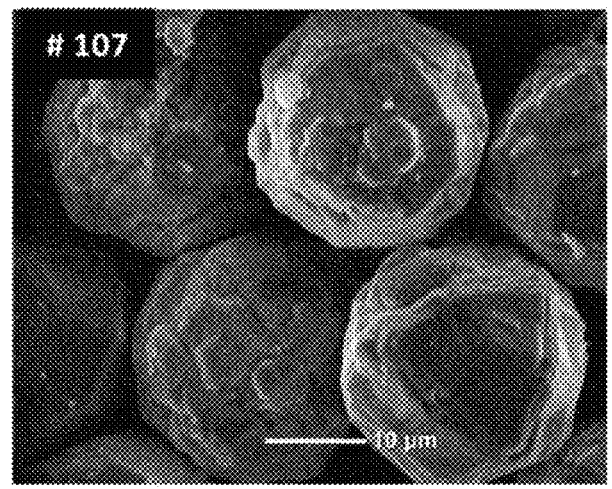
FIG. 6 is a scanning electron microscope (SEM) image of an aluminosilicate structure body having a polyhedral (ANA type) morphology prepared in Comparative Example 1 of the present inventive concept.

The surfaces of the prepared aluminosilicate structure body particles were observed under a scanning electron microscope, and are illustrated in FIG. 6.

As illustrated in FIG. 6, it was confirmed that the prepared particles had a polygonal morphology.

<Analysis>

X-ray diffraction analysis (XRD) was performed on the aluminosilicate structure body having a skein-shaped morphology prepared according to the present inventive concept.

Specifically, in the X-ray diffraction analysis, copper Kα rays and an X-ray tube operating at 40 kV and 40 mA were used as a radiation source. Measurements were made by scanning a horizontally compressed powder sample at a rate of 2 degrees per minute (2θ) from a start angle of 5 degrees to an end angle of 50 degrees. d and I were calculated from the 2θ value and the peak height of the observed X-ray diffraction peak. The resulting values were expressed as W (weak: 0 to 20), M (medium: 20 to 40), S (strong: 40 to 60), and VS (very strong: 60 to 100) depending on the value of relative strength 100×I/I$_0$.

The measurement results of X-ray diffraction analysis of the aluminosilicate structure having a skein-shaped morphology of Preparation Example 3 are shown in FIG. 7 and the following Table 3.

TABLE 3

| No. | 2θ | d | 100 × I/I$_0$ (Relative strength) |
|---|---|---|---|
| 1 | 7.36 | 12.00 | W |
| 2 | 9.38 | 9.42 | W |
| 3 | 12.44 | 7.11 | S |

TABLE 3-continued

| No. | 2θ | d | 100 × I/I$_0$ (Relative strength) |
|---|---|---|---|
| 4 | 12.78 | 6.92 | S |
| 5 | 15.80 | 5.60 | W |
| 6 | 17.52 | 5.06 | VS |
| 7 | 19.69 | 4.51 | W |
| 8 | 20.48 | 4.33 | S |
| 9 | 21.58 | 4.11 | S |
| 10 | 22.26 | 3.99 | M |
| 11 | 22.70 | 3.91 | W |
| 12 | 24.80 | 3.59 | W |
| 13 | 25.08 | 3.55 | W |
| 14 | 25.76 | 3.46 | VS |
| 15 | 26.68 | 3.34 | W |
| 16 | 28.06 | 3.18 | VS |
| 17 | 28.42 | 3.14 | W |
| 18 | 29.92 | 2.98 | S |
| 19 | 30.42 | 2.94 | VS |
| 20 | 31.29 | 2.86 | W |
| 21 | 33.36 | 2.68 | M |
| 22 | 34.32 | 2.61 | S |
| 23 | 35.48 | 2.53 | W |
| 24 | 35.76 | 2.51 | W |
| 25 | 38.02 | 2.36 | W |
| 26 | 38.78 | 2.32 | W |
| 27 | 39.08 | 2.30 | W |
| 28 | 40.16 | 2.24 | W |
| 29 | 42.32 | 2.13 | W |
| 30 | 43.14 | 2.10 | M |
| 31 | 44.14 | 2.05 | W |
| 32 | 46.04 | 1.97 | W |
| 33 | 47.42 | 1.92 | W |

In Table 3, 2θ, d, and I denote the Bragg angle, the lattice spacing, and the intensity of the X-ray diffraction peak, respectively. FIG. 7 is a graph of comparing X-ray diffraction analysis (XRD) patterns of aluminosilicate structure bodies having a skein-shaped morphology prepared in Preparation Examples 3 and 5 of the present inventive concept.

As illustrated in FIG. 7, it can be seen that the two aluminosilicate structure bodies having a skein-shaped morphology prepared according to the present inventive concept have the same crystal structure due to matching of the 2θ positions of the peaks.

Further, the X-ray diffraction analysis results of the aluminosilicate structure body having a skein-shaped morphology prepared according to the present inventive concept and the aluminosilicate structure having a spherical or polygonal morphology of the comparative example were compared, and are illustrated in FIGS. 8 and 9.

FIG. 8 is a graph of comparing the X-ray diffraction analysis (XRD) patterns of aluminosilicate structure bodies prepared in Preparation Example 3 and Comparative Example 1 of the present inventive concept.

FIG. 9 is a graph of comparing the X-ray diffraction analysis (XRD) patterns of aluminosilicate structure bodies prepared in Preparation Example 3 and Comparative Example 2 of the present inventive concept.

As illustrated in FIGS. 8 and 9, it was confirmed that the aluminosilicate structure body having a skein-shaped morphology prepared in the present inventive concept has a novel crystal structure different from that of the spherical aluminosilicate structure body of Comparative Example 1, which has a GIS crystal structure or the polygonal aluminosilicate structure body of Comparative Example 2, which has an ANA crystal structure, due to exhibiting an XRD pattern different from that of the aluminosilicate structure body in Comparative Example 1 or 2.

Experimental Example 1: Effect of Seed on Aluminosilicate Structure Body in which Morphology is Produced In the preparation of the aluminosilicate structure body having a skein-shaped surface morphology with a novel crystal structure according to the present inventive concept, the following experiment was performed to investigate the effect of a seed to be added on an aluminosilicate structure body in which a morphology was produced.

Figure 10:
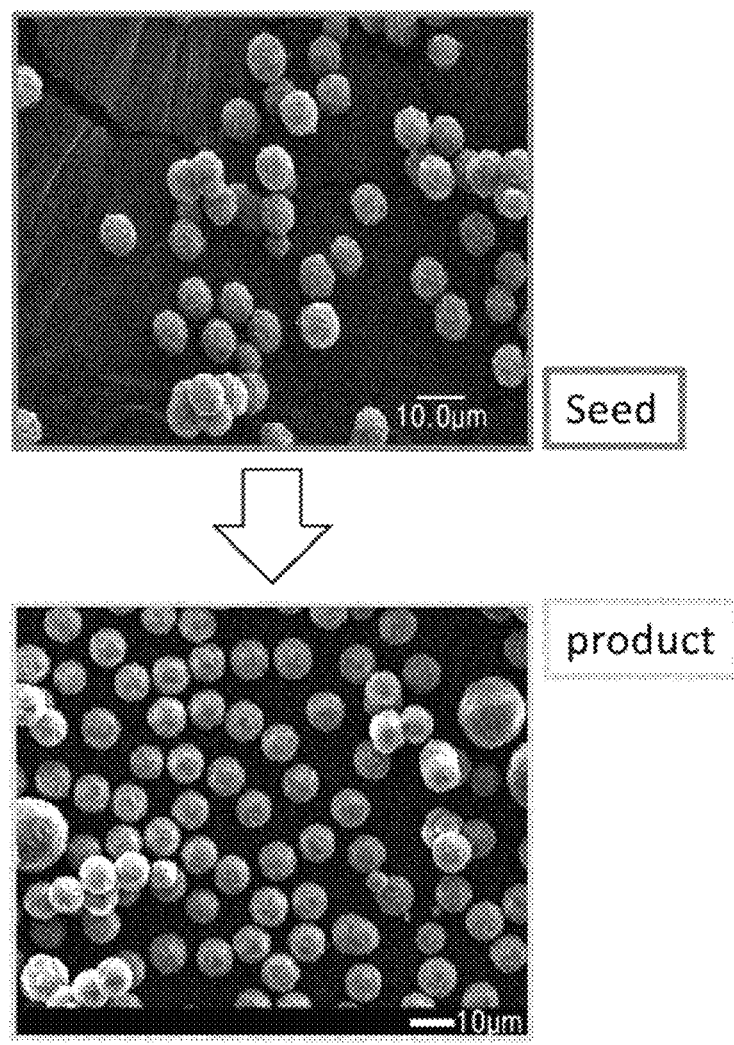
FIG. 10 is a scanning electron microscope (SEM) image illustrating the morphology of a product according to the morphology (skein-shaped) of the seed to be added in an experimental example of the present inventive concept.
Figure 11:
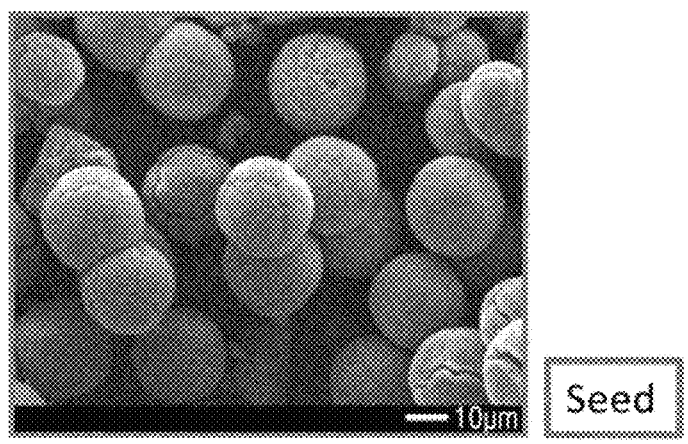
FIG. 11 is a scanning electron microscope (SEM) image illustrating the morphology of a product according to the morphology (skein-shaped) of the seed to be added in an experimental example of the present inventive concept.
Figure 11:
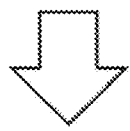
Figure 11:
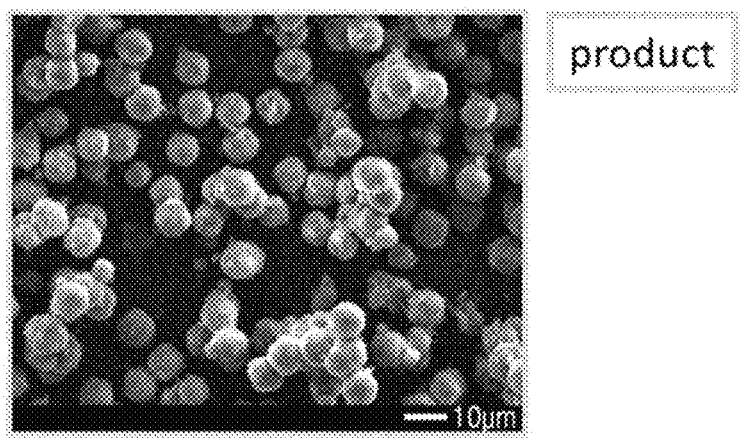
Figure 12:
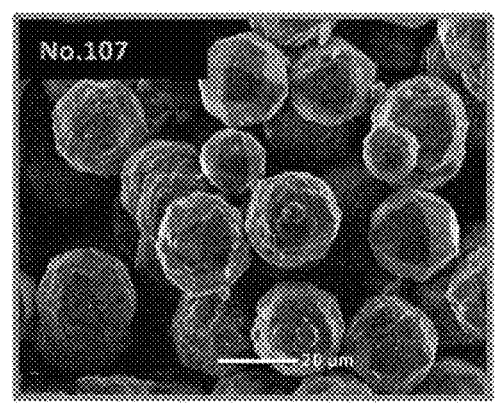
FIG. 12 is a scanning electron microscope (SEM) image illustrating the morphology of a product according to the morphology (polygonal) of the seed to be added in an experimental example of the present inventive concept.
Figure 12:
Figure 12:
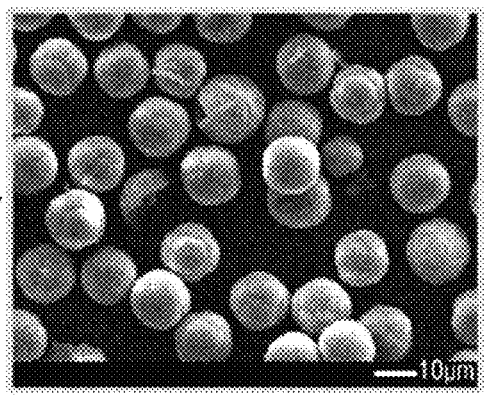

After seeds having a morphology such as a skein-shaped, spherical, or polygonal were prepared to prepare aluminosilicate structure bodies by the method in Preparation Example 1, the morphologies were observed under a scanning electron microscope, and are illustrated in FIGS. 10 to 12, respectively.

FIG. 10 is a scanning electron microscope (SEM) image illustrating the morphology of a product when the seed to be added has a skein-shaped morphology in an experimental example of the present inventive concept.

FIG. 11 is a scanning electron microscope (SEM) image illustrating the morphology of a product when the seed to be added has a spherical morphology in an experimental example of the present inventive concept.

FIG. 12 is a scanning electron microscope (SEM) image illustrating the morphology of a product when the seed to be added has a polygonal morphology in an experimental example of the present inventive concept.

As illustrated in FIGS. 10 to 12, when the seed had a skein-shaped morphology, an aluminosilicate structure body whose seed also produced a product having a skein-shaped morphology was produced regardless of the size of the seed to be added, but when the seed had a morphology such as a smooth sphere or polygon different from the skein-shaped morphology, the morphology of the product was not skein-shaped regardless of the size of the seed to be added, or a non-uniform skein-shaped morphology was produced even though the skein-shaped morphology was produced.

Therefore, it can be seen that the seed to be added preferably has a skein-shaped morphology.

Experimental Example 2: Effect of Addition of Acid-Treated Seed on Produced Aluminosilicate Structure Body In the preparation of the aluminosilicate structure body having a novel crystal structure and a skein-shaped surface morphology according to the present inventive concept, the following experiment was performed to investigate the effect of the addition of an acid-treated seed on the produced aluminosilicate structure body.

Figure 13:
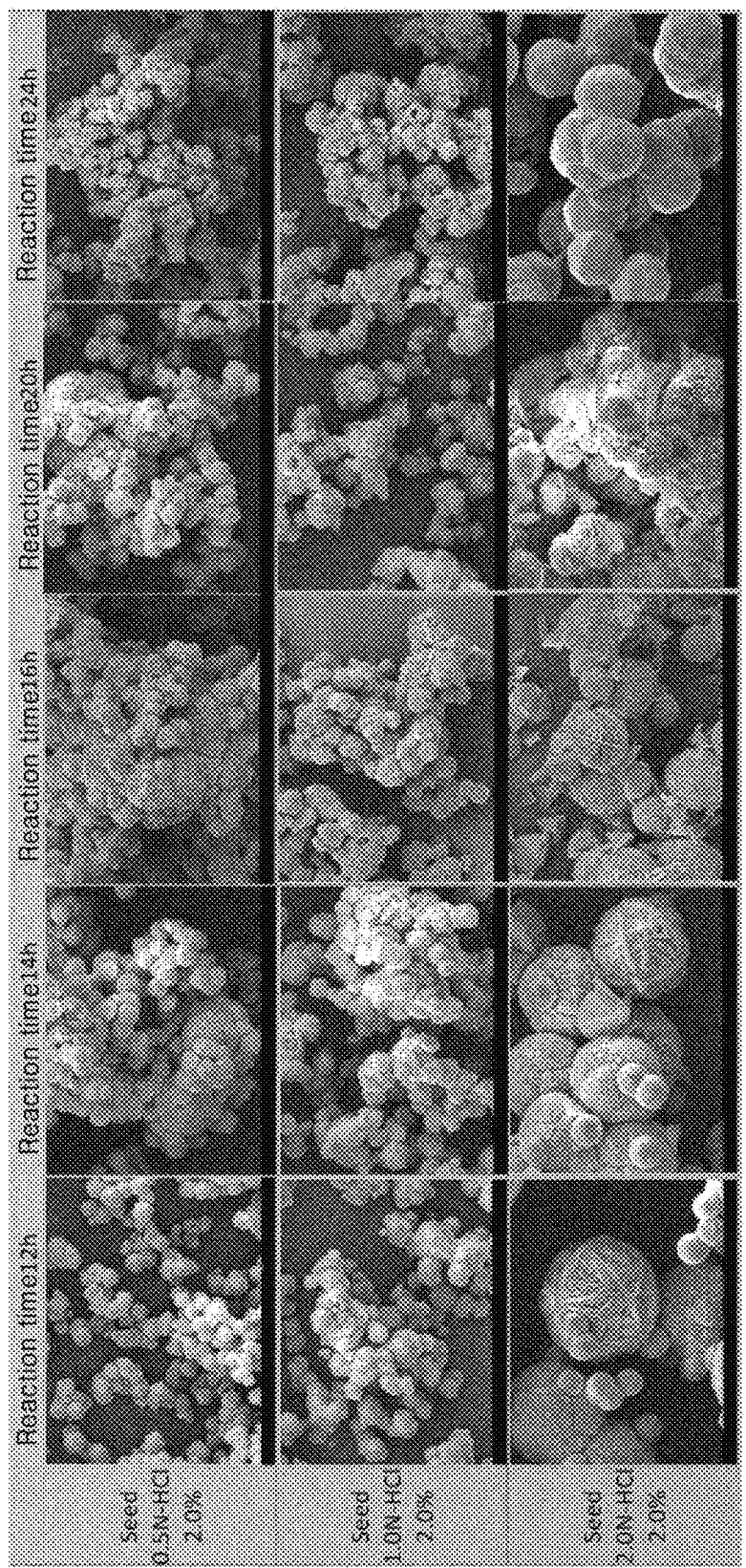
FIG. 13 is a set of images illustrating the effect of acid treatment during the addition of the seed on the morphology of the product in the method for preparing aluminosilicate according to the present inventive concept.

After an acid treatment was performed by immersing a seed having a skein-shaped morphology in a 2.0% hydrochloric solution at 0.5 N, 1.0 N or 2.0 N, the acid-treated seed was added, and then the morphologies of the product over the reaction time were observed under a scanning electron microscope, and are illustrated in FIG. 13.

As illustrated in FIG. 13, when the acid-treated seed was used, morphologies other than the skein-shaped morphology were formed on the surfaces of the produced aluminosilicate structure bodies, and as the reaction time elapsed, the proportion of the skein-shaped morphology was decreased.

Therefore, it can be seen that in the preparation of the aluminosilicate structure body having a novel crystal structure and a skein-shaped surface morphology according to the present inventive concept, it is difficult to uniformly form an aluminosilicate structure having a skein-shaped morphology when an acid-treated seed is used.

Experimental Example 3: Effect of Seed Addition on Aluminosilicate Structure Body in which Viscosity of Reaction Mother Solution is Produced Generally, the viscosity of a reaction mother solution varies depending on the rate at which the aqueous sodium aluminate solution is added to the aqueous sodium silicate solution.

Thus, in the preparation of the aluminosilicate structure body having a novel crystal structure and a skein-shaped surface morphology according to the present inventive concept, the following experiment was performed to investigate the effect of seed addition on an aluminosilicate structure body in which the viscosity of the reaction mother solution is produced.

Figure 14:
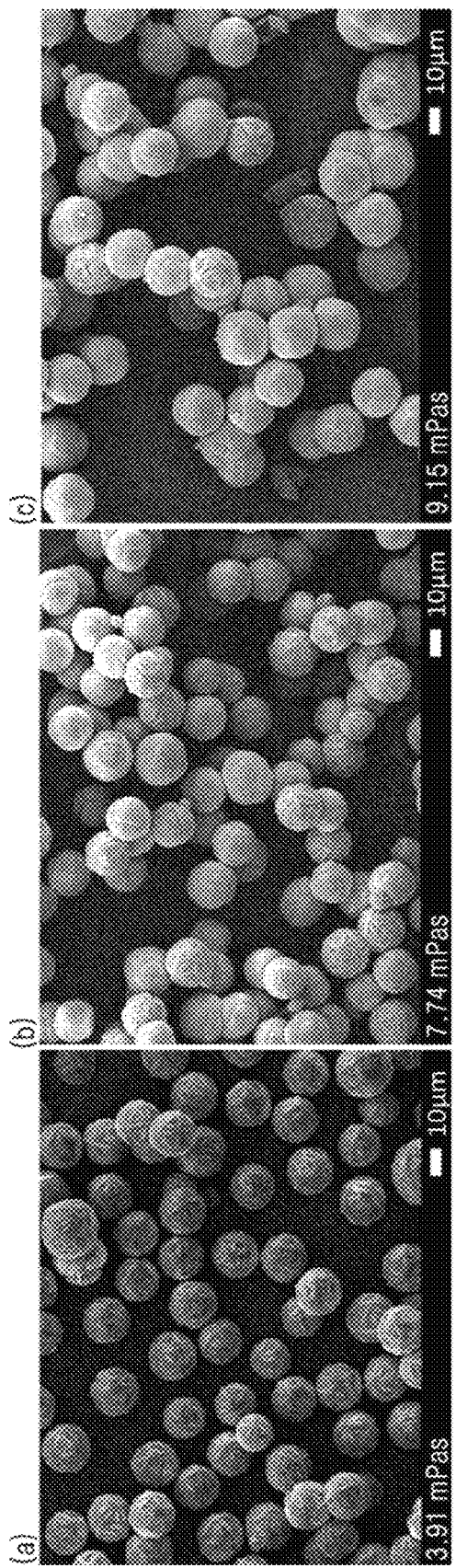
FIG. 14 is a set of images illustrating the effect of the viscosity of a reaction mother solution during the addition of the seed on the morphology of the product in the method for preparing aluminosilicate according to the present inventive concept.

Specifically, after an aqueous sodium aluminate solution (second solution) was stirred while being added to an aqueous sodium silicate solution (first solution) in three ways of quickly, normally, and slowly, the viscosity of a reaction mother solution prepared in this case was measured by a viscometer, and a seed was added thereto, and then the surface of an aluminosilicate structure body prepared by performing a crystallization reaction according to Preparation Example 1 was observed under a scanning electron microscope (SEM), and the results are illustrated in FIG. 14.

FIG. 14 is a set of scanning electron microscope (SEM) images illustrating the morphology of a product produced according to the viscosity of a reaction mother solution when a seed was added thereto in the method for preparing an aluminosilicate according to the present inventive concept, (A) is a case where an aqueous sodium aluminate solution (second solution) is quickly added to an aqueous sodium silicate solution (first solution), (B) is a case where an aqueous sodium aluminate solution (second solution) is added to an aqueous sodium silicate solution (first solution) at a normal rate, and (C) is a case where an aqueous sodium aluminate solution (second solution) is slowly added to an aqueous sodium silicate solution (first solution).

As illustrated in FIG. 14, (A) when an aqueous sodium aluminate solution (second solution) was quickly added to an aqueous sodium silicate solution (first solution), the viscosity of the reaction mother solution was shown to be 3.91 mPas, and in this case, the aluminosilicate prepared by adding the seed clearly showed a skein morphology. However, as illustrated in FIGS. 14(B) and (C), as the rate at which the aqueous sodium aluminate solution (second solution) was added to was decreased, the viscosity of the reaction mother solution was increased to 7.74 mPas and 9.15 mPas, respectively, and as a result, it was found that the number of aluminosilicate structures having a skein-shaped morphology was gradually decreasing in the produced aluminosilicate structure body.

Therefore, in the method for preparing an aluminosilicate according to the present inventive concept, it can be seen that it is important to lower the viscosity of the reaction mother solution by quickly adding an aqueous sodium aluminate solution (second solution) to an aqueous sodium silicate solution (first solution) in order to prepare an aluminosilicate having a uniform skein-shaped morphology, and it can be seen that when the viscosity of the reaction mother solution is preferably 3.1 to 7.74 mPas, and more preferably 3.9 to 5.5 mPas, the skein-shaped morphology is clearly formed.

Experimental Example 4: Effect of Seed Addition Amount on Particle Size of Produced Aluminosilicate Structure Body In the preparation of the aluminosilicate structure body having a novel crystal structure and a skein-shaped surface morphology according to the present inventive concept, the following experiment was performed in order to investigate the effect of seed addition amount during the seed addition on the produced aluminosilicate structure body.

In Preparation Example 1, the seed was added by changing the seed addition amount to 0.5 g, 1 g, 2 g or 4 g based on 1 kg of the reaction mother solution, and as a result, the average particle diameter of the aluminosilicate structure body having the produced skein-shaped morphology was measured, and is shown in the following Table 4.

TABLE 4

| Seed addition amount (g) | Seed addition amount (wt %) | Size (particle diameter, μm) of product |
|---|---|---|
| 0.5 | 0.05 | 13-15 |
| 1 | 0.1 | 9-11 |
| 2 | 0.2 | 6-8 |
| 4 | 0.4 | 4-6 |

As shown in Table 4, it was found that as the seed addition amount was increased, the size of the product was rather decreased. FIG. 15 is a schematic view describing the effect of the addition of the seed on the size of the product in the method for preparing aluminosilicate according to the present inventive concept.

Referring to FIG. 15, the reaction mother solution contains a nucleus 10 and a source 20 required for the nucleus to grow, and even though the nucleus 10 grows, it is difficult for the nucleus 10 to grow to the size of the seed 30. In this case, when an appropriate amount of seed 30 is added, the seed 30 serves as a nucleus, and thus the size of particles produced and grown with a growth source 20 is large, but when the amount of the seed 30 is increased, the nuclei 10 and the seeds 30 share the growth source 20 in the limited growth source 20, so the size of produced particles is rather decreased.

Therefore, the size of produced particles may be adjusted by adjusting the amount of seed 30 added.

Experimental Example 5: Effect of Reaction Time on Particle Size of Produced Aluminosilicate Structure Body In the preparation of the aluminosilicate structure body having a novel crystal structure and a skein-shaped surface morphology according to the present inventive concept, the following experiment was performed in order to investigate the effect of the conditions of hydrothermal treatment after the seed addition on the produced aluminosilicate structure body.

In Preparation Example 5, the average particle diameter of the aluminosilicate structure body having the produced skein-shaped morphology was measured while changing the reaction time of the hydrothermal treatment, and is shown in the following Table 5.

TABLE 5

| Reaction time (h) | Size (particle diameter, μm) of product |
|---|---|
| 12 | 13-15 |
| 10 | 19-21 |
| 8 | 30-35 |

As shown in Table 5, the reaction time of the hydrothermal treatment affects the size of the product, and accordingly, it can be seen that the size of produced particles may be adjusted by adjusting the reaction time of the hydrothermal treatment.

Experimental Example 6: pH Stability Experiment of Skein-Shaped Aluminosilicate Structure Body The following experiment was performed in order to investigate the pH stability of the aluminosilicate structure body having a novel crystal structure and a skein-shaped surface morphology prepared according to the present inventive concept.

Figure 16:
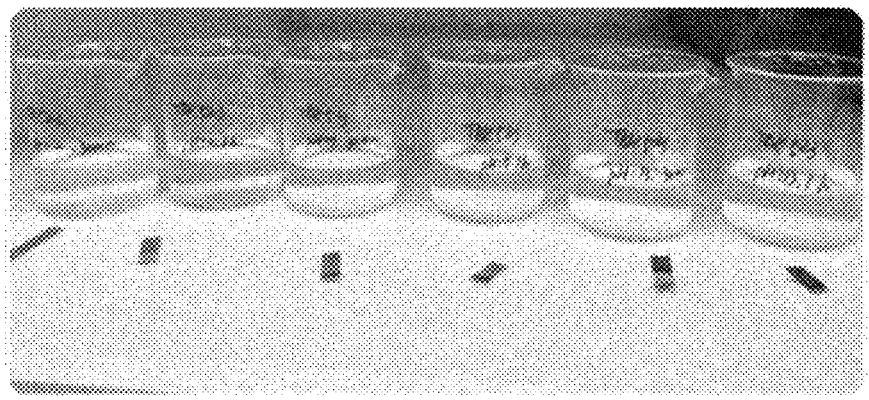
FIG. 16 illustrates a pH stability experimental photograph of aluminosilicate structure bodies having a novel crystal structure and a skein-shaped morphology according to the present inventive concept and a graph of the results.
Figure 16:
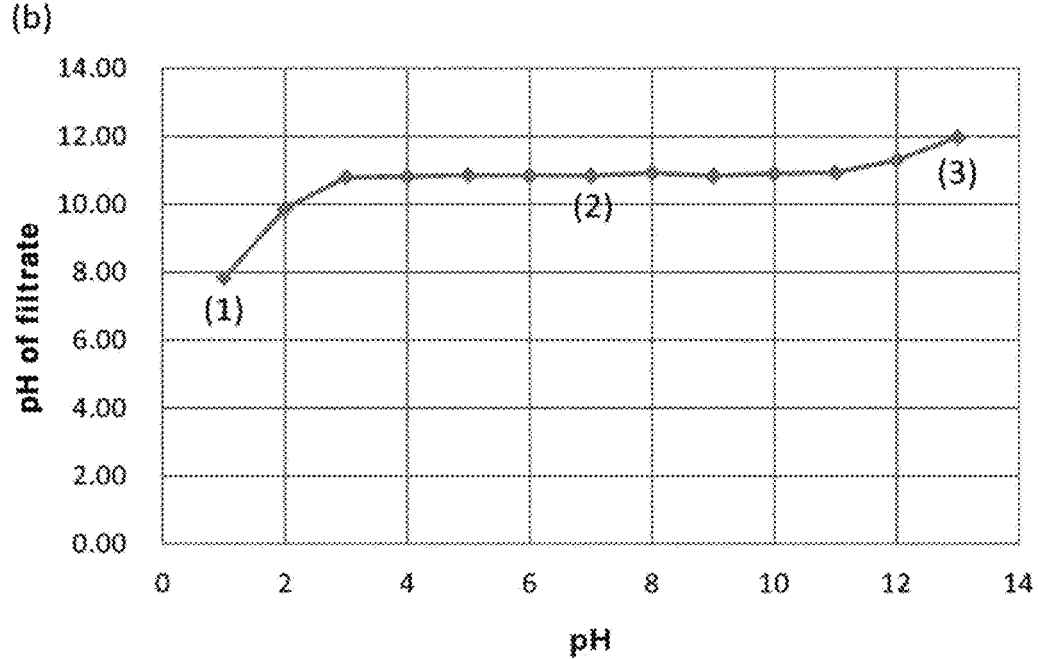

FIG. 16 illustrates a pH stability experimental photograph of aluminosilicate structure bodies having a novel crystal structure and a skein-shaped morphology according to the present inventive concept and a graph of the results.

Specifically, as illustrated in FIG. 16A, the aluminosilicate structure body prepared in Preparation Example 1 was added to acidic, neutral, and basic solvents, the aluminosilicate structure was filtered with a filter paper after 30 minutes or 1 hour and dried in an oven at 45° C., and then the yield and XRD were measured, and the pH of the filtrate was measured.

In this case, an acidic solvent obtained by diluting hydrochloric acid in distilled water was used as the acidic solvent, distilled water was used as the neutral solvent, and a NaOH solution was used as the basic solvent.

Figure 17:
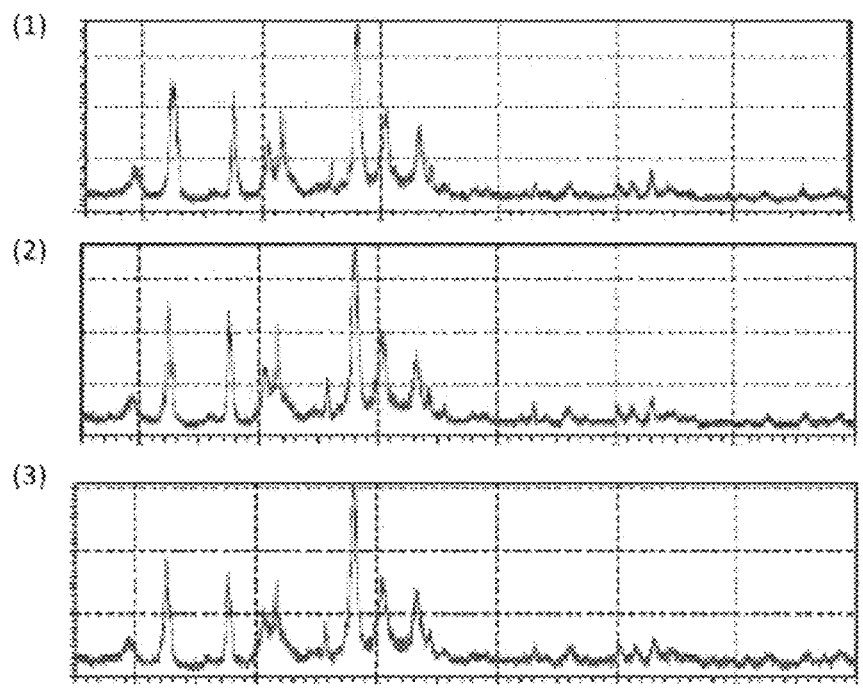
FIG. 17 is a set of X-ray diffraction analysis (XRD) patterns illustrating the presence or absence of a structural change in the aluminosilicate structure body having a novel crystal structure and a skein-shaped morphology according to the present inventive concept in acidic, neutral, and basic solvents in a pH stability experiment of the aluminosilicate structure body.

As a result of measurement, the yields of the aluminosilicate structures filtered from the acidic, neutral and basic solutions are shown in the following Table 6, the pH of the filtrate is illustrated in FIG. 16B, and the XRD of the aluminosilicate structure filtered from each pH solution is illustrated in FIG. 17.

TABLE 6

| Classification | Time | Yield (%) |
|---|---|---|
| Acidic (pH 2) | 30 minutes | 97.4% |
| Acidic (pH 2) | 1 hour | 97.9% |
| Neutral (pH 7) | 30 minutes | 98.5% |
| Neutral (pH 7) | 1 hour | 98.1% |
| Basic (pH 13) | 30 minutes | 97.3% |
| Basic (pH 13) | 1 hour | 97.0% |

FIG. 17 is a set of X-ray diffraction analysis (XRD) patterns illustrating the presence or absence of structural change in the aluminosilicate structure body according to the present inventive concept in an (1) acidic, (2) neutral and (3) basic solvent. As illustrated in FIG. 16A, it was confirmed that the yield was not significantly affected by acidity because the aluminosilicate structure body according to the present inventive concept showed a yield of 97% or more regardless of the pH environment. In addition, as illustrated in FIG. 17, it was confirmed that the aluminosilicate structure body according to the present inventive concept had no chemical structural change with respect to pH by showing the same XRD pattern regardless of the pH environment.

Furthermore, as illustrated in FIG. 16B, it was shown that the pH of the filtrate was kept constant without a large variation with respect to various pH environments. Therefore, it can be seen that the aluminosilicate structure body according to the present inventive concept has high pH stability.

Figure 18:
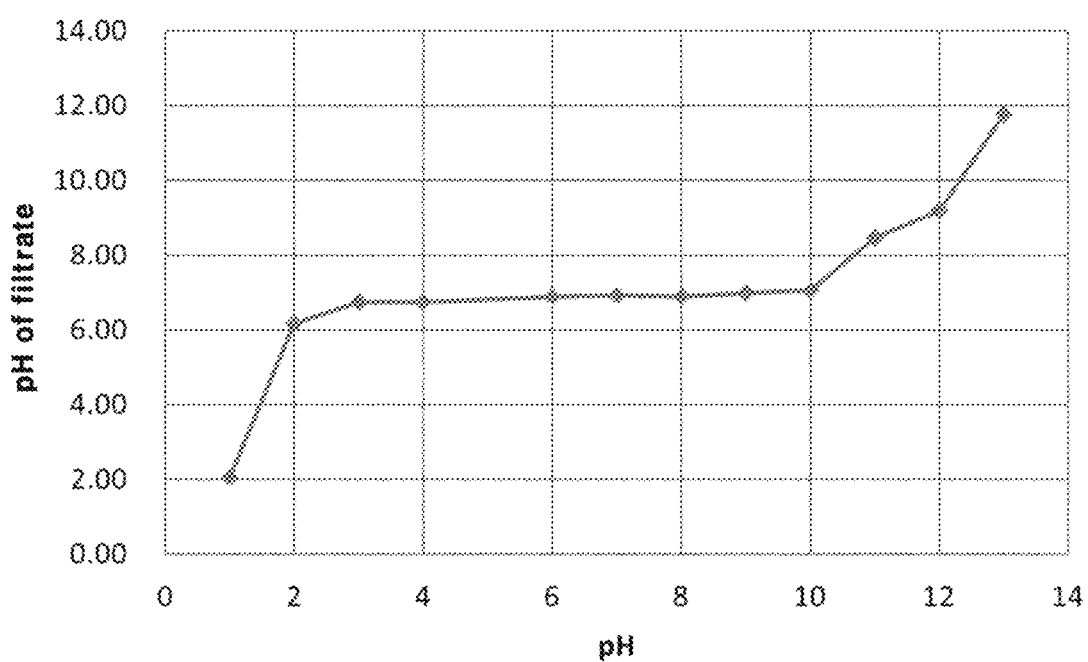
FIG. 18 is a graph of the pH stability experimental results of silica gel used as a stationary phase for columns in the related art.

Meanwhile, as comparative examples, after silica gel usually used as a stationary phase for HPLC columns in the related art was put into acidic, neutral and basic solvents in the same manner for 30 minutes, the resulting mixture was filtered, and the pH of the remaining filtrate was measured, and is illustrated in FIG. 18.

As illustrated in FIG. 18, it can be seen that in the case of silica gel, the pH of the filtrate was kept constant in a pH range of 2 to 10, whereas in a basic solvent whose pH exceeds 10, the pH of the filtrate is also increased, and thus the pH stability is relatively low.

Therefore, the aluminosilicate structure body according to the present inventive concept has higher pH stability than that of silica gel used as a stationary phase for HPLC columns in the related art, and thus may be usefully used for HPLC regardless of pH.

Experimental Example 7: Measurement of Separation Ability of Skein-Shaped Aluminosilicate Structure Body The following experiment was performed in order to investigate the separation ability characteristics of the aluminosilicate structure body having a skein-shaped surface morphology with a novel crystal structure according to the present inventive concept.

Specifically, HPLC columns were filled with the aluminosilicate structure body having a skein-shaped surface morphology with a novel crystal structure prepared in Preparation Example 1 as a stationary phase, and HPLC separation was performed on (a) a mixed solvent in which water and ethanol were mixed at a volume ratio of 80:20, (b) a mixed solvent in which water and acetonitrile were mixed at a volume ratio of 85:15, (c) a mixed solvent in which water and methanol were mixed at a volume ratio of 75:25, and (d) a mixed solvent in which water and isopropyl alcohol were mixed at a volume ratio of 85:15, as analytes.

Figure 19:
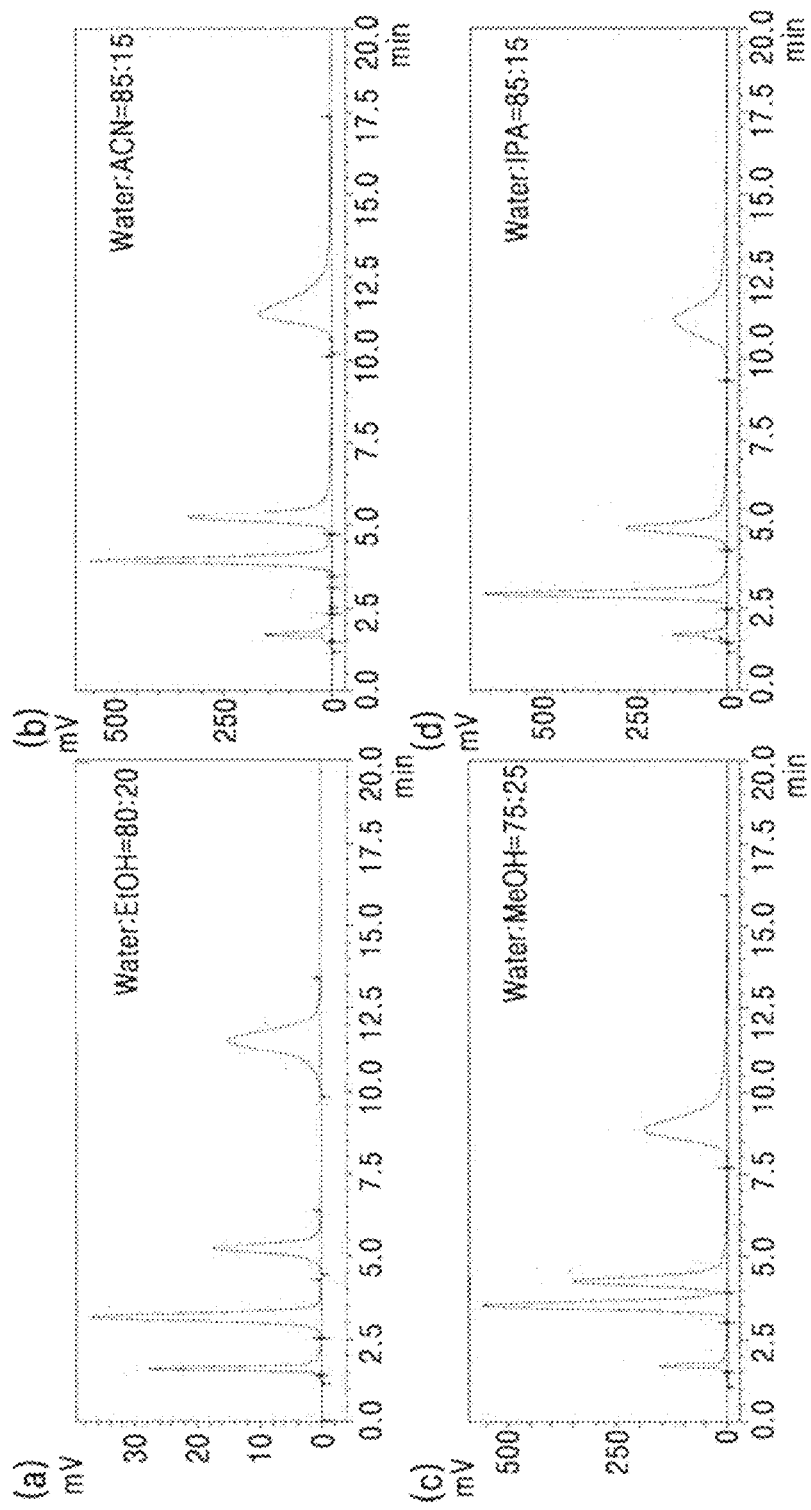
FIG. 19 is a set of graphs illustrating the ability of an HPLC column filled with the aluminosilicate structure body having a novel crystal structure and a skein-shaped morphology according to the present inventive concept as a stationary phase to separate a mixed solvent.

The results are illustrated in FIG. 19.

As illustrated in FIG. 19, when the mixed solvent was separated using the aluminosilicate structure body of the present inventive concept as a stationary phase for HPLC columns, it was shown that the mixed solvent was clearly separated, showing excellent separation ability.

Therefore, the aluminosilicate structure body having a novel crystal structure of the present inventive concept has a skein-shaped surface morphology, exhibits a wide surface area because the size of particles can be adjusted, and exhibits excellent separation ability, and thus may be usefully used as a stationary phase for HPLC columns.

Although the present inventive concept has been described above with reference to preferred embodiments, it should be understood that the present inventive concept is not limited to the embodiments. The embodiments of the present inventive concept can be variously altered and modified within the scope of the claims to be described below, and all of them fall within the scope of the present inventive concept. Therefore, the present inventive concept is limited only by the claims and equivalents thereof.

EXPLANATION OF REFERENCE NUMERALS AND SYMBOLS

10: Nucleus
20: Growth source
30: Seed

The invention claimed is:

1. An aluminosilicate structure body having a basic framework structure of the following Chemical Formula 1, an X-ray diffraction pattern comprising lattice spacings shown in the following Table 1, and a skein-shaped morphology on a surface layer:

$$1.0\ Al_2O_3:10.0\ \text{to}\ 60.0\ SiO_2 \qquad \text{[Chemical Formula 1]}$$

TABLE 1

| 2θ | d | 100 × I/I$_0$ |
|---|---|---|
| 12.4-12.8 | 6.90-7.15 | S |
| 17.5-17.6 | 5.00-5.10 | S~VS |
| 20.4-21.6 | 4.10-4.34 | M~S |
| 25.7-25.8 | 3.44-3.48 | M~VS |
| 28.0-28.1 | 3.16-3.20 | M~VS |
| 30.4-30.5 | 2.92-2.96 | M~VS |
| 33.3-33.4 | 2.66-2.70 | W~M | wherein 2θ, d, and I denote the Bragg angle, the lattice spacing, and the intensity of X-ray diffraction peak in powder X-ray diffraction data, respectively, wherein the powder X-ray diffraction data was measured using a standard X-ray diffraction method, and copper Kα rays and an X-ray tube operating at 40 kV and 40 mA were used as a radiation source, wherein the powder X-ray diffraction data was measured from a horizontally compressed powder sample at a rate of 2 degrees (2θ) per minute, the d and I were calculated from the 2θ values and peak heights of the observed X-ray diffraction peaks, and the resulting values are expressed as W (weak: 0 to 20), M (medium: 20 to 40), S (strong: 40 to 60), and VS (very strong: 60 to 100) depending on the value of relative strength 100×I/I$_0$.

2. The aluminosilicate structure body of claim 1, wherein the aluminosilicate structure body has an average particle diameter of 5 to 50 μm.

3. The aluminosilicate structure body of claim 1, wherein the aluminosilicate structure body has a BET surface area of 20 to 300 m$^2$/g.

4. A method for preparing an aluminosilicate structure body having a basic framework structure of the following Chemical Formula 1, an X-ray diffraction pattern comprising lattice spacings shown in the following Table 1, and a skein-shaped morphology on a surface layer, the method comprising: preparing a reaction mother solution having a viscosity of 3.1 to 7.1 mPas by adding an aqueous sodium silicate solution prepared by reacting an aqueous sodium hydroxide solution and a silica source to an aqueous sodium aluminate solution prepared by reacting an aqueous sodium hydroxide solution and an alumina source, and stirring the resulting mixture (S10);

preparing a synthetic mixture by adding a seed to the reaction mother solution and aging the resulting mixture under stirring (S20); and preparing an aluminosilicate structure body having a novel crystal structure and the skein-shaped morphology by hydrothermally treating the synthetic mixture (S30):

$$1.0\ Al_2O_3:10.0\ \text{to}\ 60.0\ SiO_2 \qquad \text{[Chemical Formula 1]}$$

TABLE 1

| 2θ | d | 100 × I/I₀ |
| --- | --- | --- |
| 12.4-12.8 | 6.90-7.15 | S |
| 17.5-17.6 | 5.00-5.10 | S~VS |
| 20.4-21.6 | 4.10-4.34 | M~S |
| 25.7-25.8 | 3.44-3.48 | M~VS |
| 28.0-28.1 | 3.16-3.20 | M~VS |
| 30.4-30.5 | 2.92-2.96 | M~VS |
| 33.3-33.4 | 2.66-2.70 | W~M | wherein 2θ, d, and I denote the Bragg angle, the lattice spacing, and the intensity of X-ray diffraction peak in powder X-ray diffraction data, respectively, wherein the powder X-ray diffraction data was measured using a standard X-ray diffraction method, and copper Kα rays and an X-ray tube operating at 40 kV and 40 mA were used as a radiation source, wherein the powder X-ray diffraction data was measured from a horizontally compressed powder sample at a rate of 2 degrees (2θ) per minute, the d and I were calculated from the 2θ values and peak heights of the observed X-ray diffraction peaks, and the resulting values are expressed as W (weak: 0 to 20), M (medium: 20 to 40), S (strong: 40 to 60), and VS (very strong: 60 to 100) depending on the value of relative strength $100 \times I/I_0$.

5. The method of claim 4, wherein a composition of the reaction mother solution is 1.0 $Al_2O_3$: 7.0 to 12.0 $SiO_2$: 4.0 to 8.0 $Na_2O$: 500 to 900 $H_2O$.

6. The method of claim 4, wherein the aqueous sodium silicate solution is added to the aqueous sodium aluminate solution and mixed within 5 minutes.

7. The method of claim 4, wherein the seed has a skein-shaped morphology.

8. The method of claim 4, wherein an addition amount of the seed is 0.001 to 2 wt % of the reaction mother solution.

9. The method of claim 4, wherein after the seed is added, aging is performed under stirring at 300 to 400 rpm for 20 to 40 minutes.

10. The method of claim 4, wherein the synthetic mixture is thermally treated at 120 to 150° C. for 8 to 28 hours.

11. An HPLC column filled with an aluminosilicate structure body having a basic framework structure of the following Chemical Formula 1, an X-ray diffraction pattern comprising lattice spacings shown in the following Table 1, and a skein-shaped morphology on a surface layer as a stationary phase:

1.0 $Al_2O_3$:10.0 to 60.0 $SiO_2$      [Chemical Formula 1]

TABLE 1

| 2θ | d | 100 × I/I₀ |
| --- | --- | --- |
| 12.4-12.8 | 6.90-7.15 | S |
| 17.5-17.6 | 5.00-5.10 | S~VS |
| 20.4-21.6 | 4.10-4.34 | M~S |
| 25.7-25.8 | 3.44-3.48 | M~VS |
| 28.0-28.1 | 3.16-3.20 | M~VS |
| 30.4-30.5 | 2.92-2.96 | M~VS |
| 33.3-33.4 | 2.66-2.70 | W~M | wherein 2θ, d, and I denote the Bragg angle, the lattice spacing, and the intensity of X-ray diffraction peak in powder X-ray diffraction data, respectively, wherein the powder X-ray diffraction data was measured using a standard X-ray diffraction method, and copper Kα rays and an X-ray tube operating at 40 kV and 40 mA were used as a radiation source, wherein the powder X-ray diffraction data was measured from a horizontally compressed powder sample at a rate of 2 degrees (2θ) per minute, the d and I were calculated from the 2θ values and peak heights of the observed X-ray diffraction peaks, and the resulting values are expressed as W (weak: 0 to 20), M (medium: 20 to 40), S (strong: 40 to 60), and VS (very strong: 60 to 100) depending on the value of relative strength $100 \times I/I_0$.

\* \* \* \* \*